(12) United States Patent
Nakayama et al.

(10) Patent No.: US 8,801,194 B2
(45) Date of Patent: Aug. 12, 2014

(54) PROJECTOR WITH ILLUMINATION CONTROL BASED ON FIXATION DEGREE

(75) Inventors: Kenji Nakayama, Kumamoto (JP); Tetsuro Mizushima, Fukuoka (JP); Tatsuo Itoh, Osaka (JP); Shinichi Kadowaki, Fukuoka (JP)

(73) Assignee: Panasonic Corporation, Osaka (JP)

( * ) Notice: Subject to any disclaimer, the term of this patent is extended or adjusted under 35 U.S.C. 154(b) by 322 days.

(21) Appl. No.: 13/318,687

(22) PCT Filed: Mar. 7, 2011

(86) PCT No.: PCT/JP2011/001320
§ 371 (c)(1),
(2), (4) Date: Nov. 3, 2011

(87) PCT Pub. No.: WO2011/111363
PCT Pub. Date: Sep. 15, 2011

(65) Prior Publication Data
US 2012/0044467 A1 Feb. 23, 2012

(30) Foreign Application Priority Data
Mar. 9, 2010 (JP) ................. 2010-051563

(51) Int. Cl.
*G03B 21/00* (2006.01)
*G03B 21/14* (2006.01)
*G03B 21/20* (2006.01)
*G03B 29/00* (2006.01)
*G03B 33/12* (2006.01)
*G06F 1/16* (2006.01)
*H04N 9/31* (2006.01)

(52) U.S. Cl.
CPC .......... *G03B 21/2053* (2013.01); *H04N 9/3173* (2013.01); *G03B 29/00* (2013.01); *H04N 9/3197* (2013.01); *H04N 9/3194* (2013.01); *G03B 21/20* (2013.01); *H04N 9/3161* (2013.01); *G03B 33/12* (2013.01); *G06F 1/1637* (2013.01); *G03B 21/00* (2013.01)
USPC .............................................. 353/85; 353/70

(58) Field of Classification Search
CPC ...... G03B 21/00; G03B 21/14; G03B 21/145; G03B 21/147; G03B 21/20; G03B 21/2053; H04N 5/74; H04N 9/31; H04N 9/3161; H04N 9/3173; H04N 9/3179; H04N 9/3185; H04N 9/3188; H04N 9/3191; H04N 9/3194
USPC .......... 353/35–31, 69–70, 85, 94, 122, 30–31
See application file for complete search history.

(56) References Cited

U.S. PATENT DOCUMENTS 5,641,957 A * 6/1997 Chae ........................ 250/231.14
5,720,539 A * 2/1998 Woo .............................. 353/69
(Continued)

FOREIGN PATENT DOCUMENTS

JP 2002-6397 1/2002
JP 2002-268142 9/2002
(Continued)

OTHER PUBLICATIONS
International Search Report issued Apr. 12, 2011 in International (PCT) Application No. PCT/JP2011/001320.

*Primary Examiner* — Georgia Y Epps
*Assistant Examiner* — Jori S Reilly-Diakun
(74) *Attorney, Agent, or Firm* — Wenderoth, Lind & Ponack, L.L.P.

(57) ABSTRACT

A projector for projecting an image light including: a laser light source for emitting a laser beam; a light modulator for modulating the laser beam to generate the image light; a projection portion for projecting the image light; a detector for detecting a fixation degree of the projector; and a controller for controlling the power of the image light on the basis of the fixation degree.

12 Claims, 27 Drawing Sheets

(56) References Cited

U.S. PATENT DOCUMENTS

| | | | |
|---|---|---|---|
| 5,800,032 A * | 9/1998 | Uchiyama et al. | 353/69 |
| 6,481,855 B2 * | 11/2002 | Oehler | 353/70 |
| 7,029,125 B2 * | 4/2006 | Wu | 353/69 |
| 7,284,866 B2 * | 10/2007 | Buchmann | 353/42 |
| 7,331,677 B2 * | 2/2008 | Horiguchi et al. | 353/57 |
| 7,494,227 B2 | 2/2009 | Yamazaki et al. | |
| 7,562,986 B2 * | 7/2009 | Yun | 353/70 |
| 7,658,498 B2 * | 2/2010 | Anson | 353/69 |
| 7,824,039 B2 * | 11/2010 | Takito et al. | 353/69 |
| 7,905,607 B2 * | 3/2011 | Takatsu et al. | 353/70 |
| 7,938,548 B2 * | 5/2011 | Nozaki et al. | 353/119 |
| 8,186,836 B2 * | 5/2012 | Nakamura | 353/85 |
| 8,235,534 B2 * | 8/2012 | Nakayama et al. | |
| 8,282,219 B2 * | 10/2012 | Tanaka | 353/70 |
| 2003/0038928 A1 * | 2/2003 | Alden | 353/122 |
| 2005/0117129 A1 * | 6/2005 | Ishino | 353/119 |
| 2006/0028624 A1 * | 2/2006 | Kaise et al. | 353/85 |
| 2007/0008501 A1 * | 1/2007 | Yamazaki et al. | 353/97 |
| 2008/0111976 A1 | 5/2008 | Takito et al. | |
| 2009/0141245 A1 * | 6/2009 | Nozaki et al. | 353/56 |
| 2009/0207380 A1 * | 8/2009 | Aruga | 353/20 |
| 2009/0244490 A1 * | 10/2009 | Nakamura | 353/43 |
| 2009/0244497 A1 | 10/2009 | Tanaka et al. | |
| 2011/0037419 A1 * | 2/2011 | Hoffman et al. | 315/313 |

FOREIGN PATENT DOCUMENTS

| | | |
|---|---|---|
| JP | 2004-286858 | 10/2004 |
| JP | 2005-352172 | 12/2005 |
| JP | 2006-47910 | 2/2006 |
| JP | 2007-17649 | 1/2007 |
| JP | 2009-115967 | 5/2009 |
| JP | 2009-244633 | 10/2009 |
| JP | 2010-197756 | 9/2010 |
| JP | 2010-226683 | 10/2010 |
| JP | 2010-226684 | 10/2010 |
| WO | 2006/098402 | 9/2006 |

* cited by examiner

PROJECTOR WITH ILLUMINATION CONTROL BASED ON FIXATION DEGREE

TECHNICAL FIELD

The present invention is related to a projector which uses a laser light source as a light source to generate an image which is projected onto a projection target.

BACKGROUND OF THE INVENTION

Recently there are increased needs for portable compact projectors. Research and development on pocket sized projectors have been progressed to meet the needs. For example, a user may put and carry the projector in their pocket.

Instead of using a lamp, use of an LED (Light Emitting Diode) or a laser light source has been proposed in order to develop compact projectors. There are researches on projectors including a compact optical system with an LED or a laser light source as a light source, a spatial modulator and a projection optical system, which are suitable for the light source.

A laser light source, which substantially works as an ideal point light source, is particularly suitable for a compact projector to achieve high efficiency in light utilization because the light is efficiently condensed in a small area. If a linearly polarized laser light source is used as a light source and if a liquid crystal panel is used as a spatial light modulator to modulate the light in response to image signals, a projector may achieve high efficiency in light utilization without a polarizing filter, which is conventionally used to convert the light entering the liquid crystal panel into linearly polarized light.

A scanning projector has also been proposed as a compact projector. The scanning projector uses a compact mirror to scan a substantially collimated laser beam and project an image without a projection lens because the scanning projector uses the substantially collimated light to project the image. Thus, it is facilitated to compact the projector, which may project an image onto a projection surface without focus adjustment.

A semiconductor laser or an SHG (Second Harmonic Generation) laser may be used as the laser light source to obtain a laser beam, which has a narrower spectral width and higher mono-chromaticity than a lamp and an LED. The resultant projector may have a wider color reproduction range to display quality images.

As aforementioned, a laser source may be used as a light source of a projector to obtain the various advantages. However, the laser light source has to be used in conformity with the safety regulations to ensure adequate safety requirements. Therefore, it is preferable that the projector uses a laser light source as a light source as safely as possible.

A conventional projector, which uses a laser light source as a light source, has a light receiver such as a photo-coupler. The light receiver detects light reflected by a projection target. For example, the projector detects an object existing just in front of the lens by means of the detected light, and then controls a liquid crystal panel to stop projecting the image light (e.g. Patent Document 1). As a result, if the eyes of a user exist just in front of the lens, the projector stops the laser beam emission to make the projector safe.

Another conventional projector with a laser light source includes an infrared camera configured to periodically monitor entry of a human body or an object into projection light. If the entry of the human body or the object is detected, the projector decreases output of the laser beam (e.g. Patent Document 2). If the human body enters the projection light, the projector sufficiently decreases output of the laser beam to secure safety for the human body. Therefore, the projector is safely operated.

Another conventional projector with a laser light source alarms a user by irradiating a laser beam at a sufficiently safe level for the human body or by voice messages or indicator lamp, before emitting the laser beam to display images (e.g. Patent Document 3). As a result, unless the user recognizes the output of the laser beam at a high level in advance, it becomes less likely that a laser beam is output to display images. Therefore the projector is safely operated.

Various problems of the aforementioned projectors which have been conventionally proposed are described.

The projector, which uses the light receiver as the photo-coupler to detect light reflected by the projection target, may detect presence of an object just in front of the lens on the basis of the detected reflected light. If there is an object just in front of the lens, the projector may stop projecting the laser beam. However, the halt of the laser beam after the detection of the reflected light from the projection target means that the laser light has already and instantaneously reached the projection object. For example, if the projection target is a human body, the human body has been instantaneously subjected to the laser beam.

The projector, which includes the infrared camera to periodically monitor entry of a human body or an object into projected light, decreases output of the laser beam if the entry is detected. However, the projector additionally requires the infrared camera and image processing means for detecting the entry of the human body or the object, which results in increased cost and power consumption of the projector. This diminishes advantages in use of the laser light source such as low power consumption characteristics.

If a laser beam is irradiated at a sufficiently safe level for a human body or if voice messages or an indicator lamp is used to alarm the user before the projector emits the laser beam to display an image, the user always has to recognize the alarm in advance to use the projector. As a result, the user may not immediately use the project. An advantage of a laser light source and an LED light source over a lamp is that both generate light immediately in response to current supply. If the laser light source is used as a light source of a projector, the user may immediately project the image light to display an image. However, if the projector generates an alarm in advance, the advantage of the laser light source such as immediate use is diminished.

Patent Document 1: JP 2002-6397 A
Patent Document 2: JP 2005-352172 A
Patent Document 3: JP 2009-244633 A

DISCLOSURE OF THE INVENTION

It is an object of the present invention to provide a safe projector with a laser light source.

A projector for projecting an image light according to one aspect of the present invention has: a laser light source configured to emit a laser beam; a light modulator which modulates the laser beam to generate the image light; a projection portion configured to project the image light; a detector configured to detect a fixation degree of the projector; and a controller configured to control a power of the image light based on the fixation degree.

A projector for projecting an image light according to another aspect of the present invention has: a laser light source configured to emit a laser beam; a light modulator which modulates the laser beam to generate the image light;

a projection portion configured to project the image light; a housing configured to store the laser light source, the light modulator and the projection portion; a power switch situated on an outer surface of the housing to switch ON/OFF of power supply for generating the image light; and a cover configured to cover the power switch, wherein the housing is configured to move with respect to the cover between a storage position where the power switch is covered by the cover and an exposure position where the power switch is exposed from the cover, and if the power switch is turned ON, the power switch makes the housing immobile from the exposure position to the storage position.

DETAILED DESCRIPTION OF THE INVENTION

Figure 1:
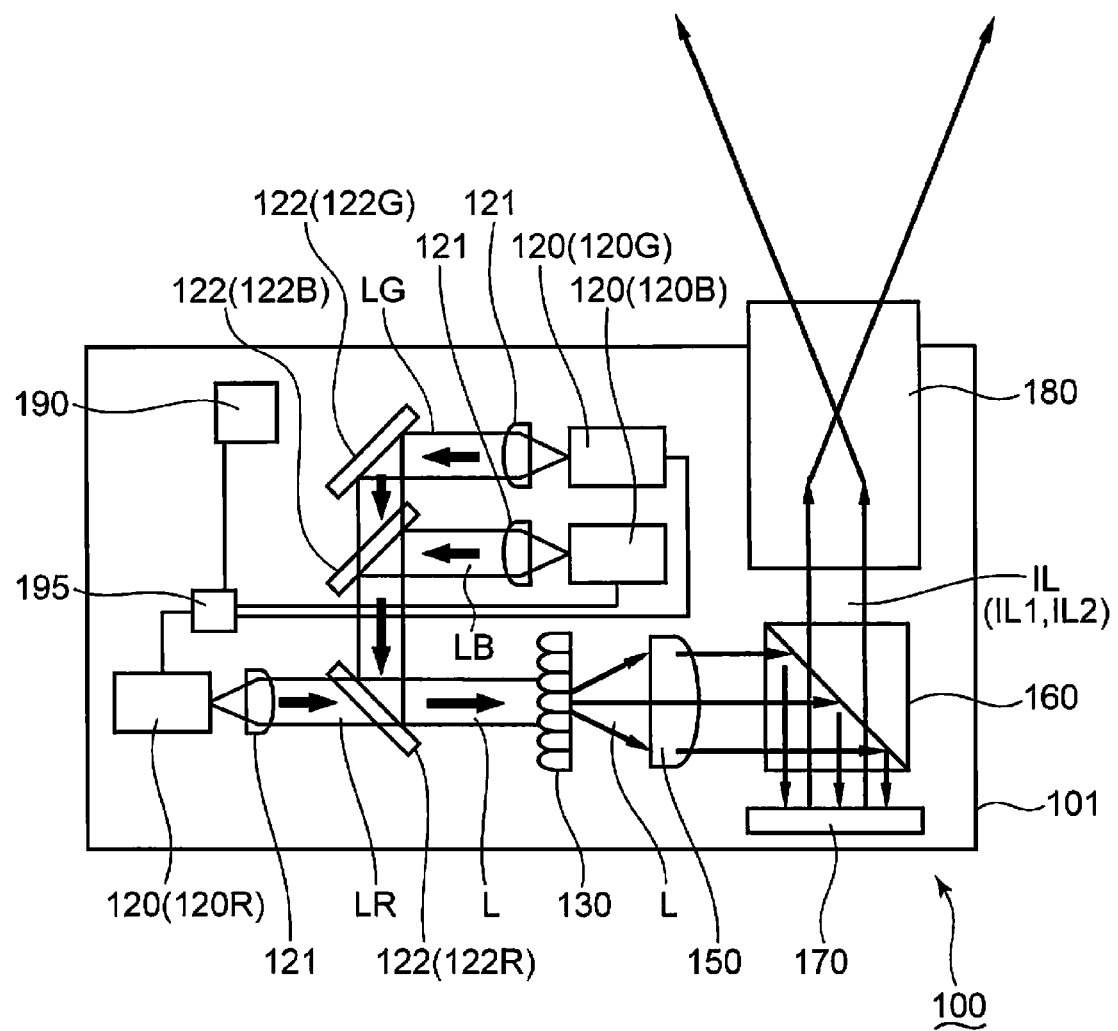
FIG. 1 is a schematic view showing a configuration of a projector according to the first embodiment.

A projector according to one embodiment is described with reference to the drawings. Components, which have identical functions or perform identical operations, are denoted with the same reference symbols in the drawings. To avoid redundancy, repetitive descriptions may be omitted as appropriate. Components in the drawings are schematically shown to assist in understanding principles of a series of the embodiments. The schematic shapes of the components shown in the drawings do not limit the principle of the embodiments described below.

First Embodiment

FIG. 1 is a schematic view showing a configuration of a projector according to the first embodiment. The projector according to the first embodiment is described with reference to FIG. 1.

As shown in FIG. 1, the projector 100 according to the first embodiment includes a laser light source 120 configured to emit a laser beam L. The laser light source 120 includes a red laser light source 120R configured to irradiate a red laser beam LR, a blue laser light source 120B configured to irradiate a blue laser beam LB, and a green laser light source 120G configured to irradiate a green laser beam LG. The projector 100 uses the laser beams LR, LB and LG to project image light IL.

The projector 100 also has a laser power source (not shown) which drives the laser light source 120, a collimate lens 121 which substantially collimates the laser beam L, a diffusion plate 130 which diffuses the laser beam L, a field lens 150 which substantially collimates the laser beam L emitted from the diffusion plate 130, a polarization beam splitter 160 which splits the laser beam L in response to the polarizing direction, and a reflective liquid crystal panel 170 which is used as a spatial modulator to modulate the laser beam L in response to image signals. The liquid crystal panel 170 modulates the laser beam L to generate the image light IL. The liquid crystal panel 170 is exemplified as the light modulator in the present embodiment.

The projector 100 further includes a projection lens 180, which projects the image light IL generated by the liquid crystal panel 170, and a housing 101 configured to store the aforementioned various optical elements. The projection lens 180 projects the image light IL from the housing 101. In the present embodiment, the projection lens 180 is exemplified as the projection portion.

The projector 100 also has a capacitance type acceleration sensor 190 which detects acceleration caused by displacement of the projector 100. In the present embodiment, the acceleration sensor 190 is exemplified as the detector configured to detect a fixation degree. The phrase "fixation degree" refers to "degree of immobility at one location". If the projector 100 remains stationary, the fixation degree becomes high. If the projector 100 is displaced at high acceleration or velocity, the fixation degree becomes low. The acceleration sensor 190 detects the acceleration of the projector 100 as the fixation degree.

The projector 100 also has a controller 195 such as a CPU. The acceleration sensor 190 outputs detection signals, which include information about the detected acceleration of the projector 100, to the controller 195. In the present embodiment, the controller 195 controls the laser light source 120 (output of the laser light source 120) in response to the detection signal to adjust the power of the image light IL emitted from the projection lens 180. The controller 195 controls not only the laser light source 120 but also the other elements such as the liquid crystal panel 170 and the projector 100. Thus, the controller 195 may control the entire operation of the projector 100.

As shown in FIG. 1, the projector 100 further includes a mirror element 122. The mirror element includes a mirror 122G which receives the green laser beam LG from the green laser light source 120G, a dichroic mirror 122B which receives the blue laser beam LB from the blue laser light source 120B, and a dichroic mirror 122R which receives the red laser beam LR from the red laser light source 120R.

As described above, the green laser beam LG collimated by the collimate lens 121 travels toward the mirror 122G. The mirror 122G reflects the green laser beam LG toward the dichroic mirror 122R. The dichroic mirror 122B between the mirror 122G and the dichroic mirror 122R allows the green laser beam LG to pass through it. The blue laser beam LB collimated by the collimate lens 121 is reflected by the dichroic mirror 122B toward the dichroic mirror 122R.

The red laser light source 120R irradiates the red laser beam LR toward the diffusion plate 130 (e.g. ground glass). The dichroic mirror 122R between the red laser light source 120R and the diffusion plate 130 allows the red laser beam LR to pass through it. The dichroic mirror 122R reflects the green and blue laser beams LG, LB, which are reflected by the mirror 122G and the dichroic mirror 122b, respectively, toward the diffusion plate 130. Thus, the dichroic mirror 122R collects the red, green and blue laser beams LR, LG and LB to one optical axis. The laser beam L, which includes the red, green and blue laser beams LR, LG and LB collected to the one optical axis, enters the diffusion plate 130.

The laser beam L is diffused by the diffusion plate 130, and then reaches the field lens 150. The field lens 150 makes the laser beam L enter the polarization beam splitter 160. The polarization beam splitter 160 reflects the laser beam L toward the liquid crystal panel 170. The resultant laser beam L enters the liquid crystal panel 170.

The liquid crystal panel 170 modulates the laser beam L to change a polarizing direction of the laser beam L in response to the image signal to generate the image light IL. The image light IL generated by the modulation of the laser beam L passes through the polarization beam splitter 160 and then reaches the projection lens 180. The projection lens 180 projects the image light IL onto a screen (not shown). Thus, an image is displayed on the screen.

In the present embodiment, the projector 100 is small enough for a user to carry it. Therefore, the user may grip and operate the projector 100. If the user projects an image onto a desired surface or an object, the user may displace the projector 100 toward the projection target.

The acceleration sensor 190 detects the acceleration caused by the displacement of the projector 100. If a value of the acceleration detected by the acceleration sensor 190 exceeds a predetermined value (threshold defined for the acceleration of the projector 100), the controller 195, to which the detection signals are input from the acceleration sensor 190, outputs the control signals to the laser light source 120. In the present embodiment, the laser light source 120 decreases a power of the laser beam L (i.e. a power of the image light IL) in response to the control signal from the controller 195. Alternatively, the laser light source 120 stops outputting the laser beam L in response to the control signal from the controller 195.

In the following descriptions, the power of the image light IL, which is required for displaying an appropriately bright image onto a projection target in response to the image signal, is called the "first power". The decreased power of the image light IL under the detected acceleration by the acceleration sensor 190, which exceeds a threshold determined for the acceleration of the projector 100, is called the "second power". The second power is lower than the first power, and is set to a level at which the image light IL is harmless for the eyes of the user even if the eyes of the user are exposed to the image light. If the laser light source 120 stops outputting the laser beam L in response to the control signal from the controller 195, the second power becomes value "0".

In the present embodiment, acceleration less than the threshold defined for the acceleration of the projector 100 is exemplified as the first acceleration. Acceleration no less than the threshold defined for the acceleration of the projector 100 is exemplified as the second acceleration. If the acceleration sensor 190 detects the first acceleration, the controller 195 sets the power of the image light IL to the first power. If the acceleration sensor 190 detects the second acceleration, the controller 195 sets the power of the image light IL to the second power.

Figure 2:
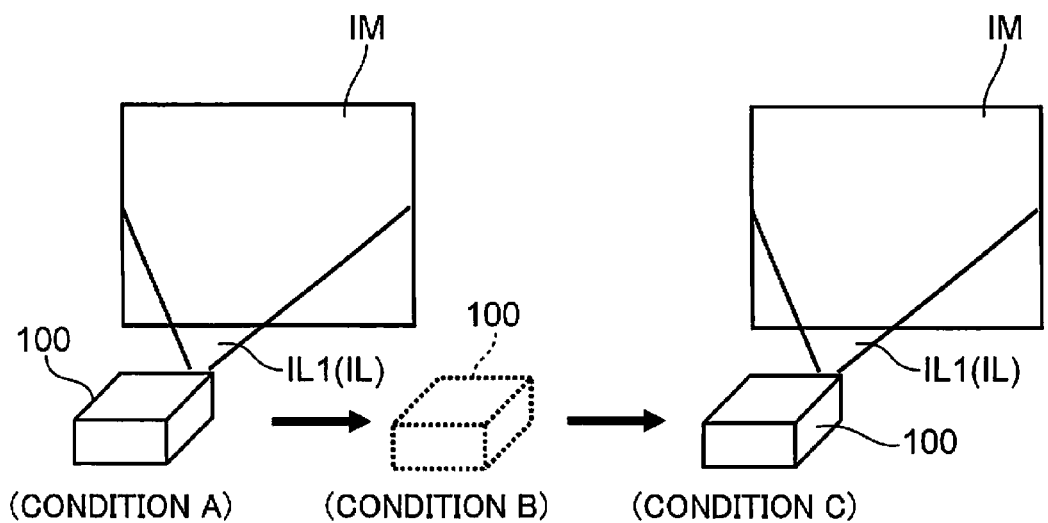
FIG. 2 is a schematic view showing projection or its halt of image light during acceleration motion of the projector shown in FIG. 1.

FIG. 2 is a schematic view showing the projector 100 under accelerated motion. Operations of the projector 100 are described with reference to FIGS. 1 and 2.

The projector 100 in the "condition A" shown in FIG. 2 is stationary. The projector 100 in the "condition B" shown in FIG. 2 is under the accelerated motion. The projector 100 in the "condition C" shown in FIG. 2 is stationary. As shown in FIG. 2, the conditions of the projector 100 sequentially changes in order of "condition A", "condition B" and "condition C".

The laser light source 120 of the projector 100 shown in FIG. 2 stops outputting the laser beam L in response to the control signals, which the controller 195 outputs in response to the detection signals from the acceleration sensor 190 detecting the second acceleration.

Since the projector 100 in the "condition A" is stationary, the acceleration sensor 190 detects the acceleration "0" (first acceleration). Therefore, the projector emits the image light IL1 at the first power.

The projector 100 in the "condition B" moves at a higher acceleration than the threshold (second acceleration). The acceleration sensor 190 outputs detection signals, which include information to indicate that the projector 100 moves at the second acceleration, to the controller 195. The controller 195 outputs the control signals to the laser light source 120 in response to the detection signals to stop outputting the laser beam L. As a result, the projector 100 stops projecting the image light IL.

Then, the projector 100 becomes stationary (condition C). The acceleration sensor 190 outputs detection signals, which include information to indicate that the projector 100 is stationary, to the controller 195. The controller 195 outputs the control signals to the laser light source 120 in response to the detection signals to restart the output of the laser beam L. As a result, the projector 100 restarts projecting the image light IL to display a sufficiently bright image IM on a projection target (e.g. screen).

If there are changes in position of the projector 100 and projection direction of the image light IL as shown in FIG. 2, the emission of the image light IL is stopped. Therefore, the projector 100 is safely operated.

Figure 3:
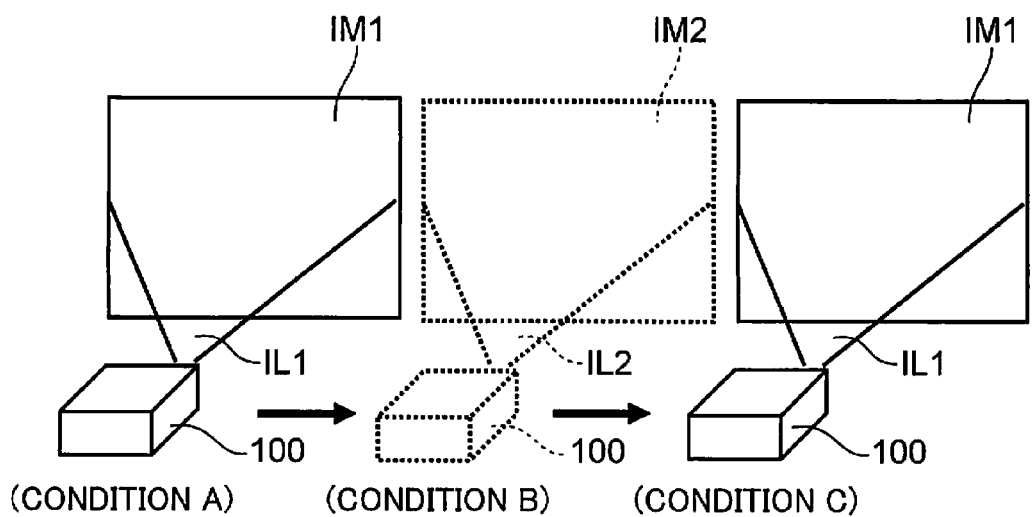
FIG. 3 is a schematic view showing projection or its halt of image light during acceleration motion of the projector shown in FIG. 1.

FIG. 3 is a schematic view showing the projector 100 under the accelerated motion. Operations of the projector 100 are described with reference to FIGS. 1 and 3.

The projector 100 in the "condition A" shown in FIG. 3 is stationary. The projector 100 in the "condition B" shown in FIG. 3 is under the accelerated motion. The projector 100 in the "condition C" shown in FIG. 3 is stationary. As shown in FIG. 3, the conditions of the projector 100 sequentially changes in order of "condition A", "condition B" and "condition C".

The laser light source 120 of the projector 100 shown in FIG. 3 decreases the output of the laser beam L in response to the control signals, which the controller 195 outputs in response to the detection signals from the acceleration sensor 190 detecting the second acceleration.

Since the projector 100 in the "condition A" is stationary, the acceleration sensor 190 detects the acceleration "0" (first acceleration). Therefore, the projector 100 emits the image light IL1 at the first power. Thus, the resultant image IM1 depicted by the image light IL1 at the first power is displayed on a projection target (e.g. screen).

The projector 100 moves at an acceleration exceeding the threshold in the "condition B" (second acceleration). The acceleration sensor 190 outputs the detection signals, which include information to indicate that the projector 100 moves at the second acceleration, to the controller 195. The controller 195 outputs the control signals to the laser light source 120 in response to the detection signals. The laser light source 120 decreases the power of the laser beam L in response to the control signal from the controller 195. As a result, the image light IL2 is projected at the second power. Thus, the resultant image IM2 depicted by the image light IL2 at the second power is displayed on the projection target. Since the image IM2 is generated by the image light IL2 which has a lower power than the image light IL1, the image IM2 becomes less bright than the image IM1.

Then, the projector 100 becomes stationary (condition C). The acceleration sensor 190 outputs detection signals, which include information to indicate that the projector 100 is stationary, to the controller 195. The controller 195 outputs the control signals to the laser light source 120 in response to the detection signals to increase the output of the laser beam L. As a result, the projector 100 restarts projecting the image light IL1 at the first power to display the image IM1 at high brightness.

If there are changes in position of the projector 100 and projection direction of the image light IL as shown in FIG. 3, the image light IL2 is emitted at the second power to make the projector 100 safe. The controller 195 adjusts the power of the image light IL with keeping the laser beam L emitted from the laser light source 120, even if the acceleration of the projector 100 exceeds the threshold. Therefore, the projection direction of the image light IL may be notified to the user and/or viewers around the projector 100. Since it becomes less likely that the user loses a projection area where the projector 100 projects an image, it is facilitated to recognize the direction of the projector 100 and the projection position of the image light IL. Thus, it becomes easy to handle the projector 100.

Second Embodiment

A method for decreasing the power of the image light, which is emitted from the projector (or stopping the image light emission), in response to the acceleration of the projector detected by the acceleration sensor is not limited to the power adjustment of the laser beam which is emitted from the laser light source. According to the second embodiment, the power of the image light emitted from the projector is decreased (or emission of the image light is stopped) by the liquid crystal panel, which is exemplified as the light modulator.

Figure 4:
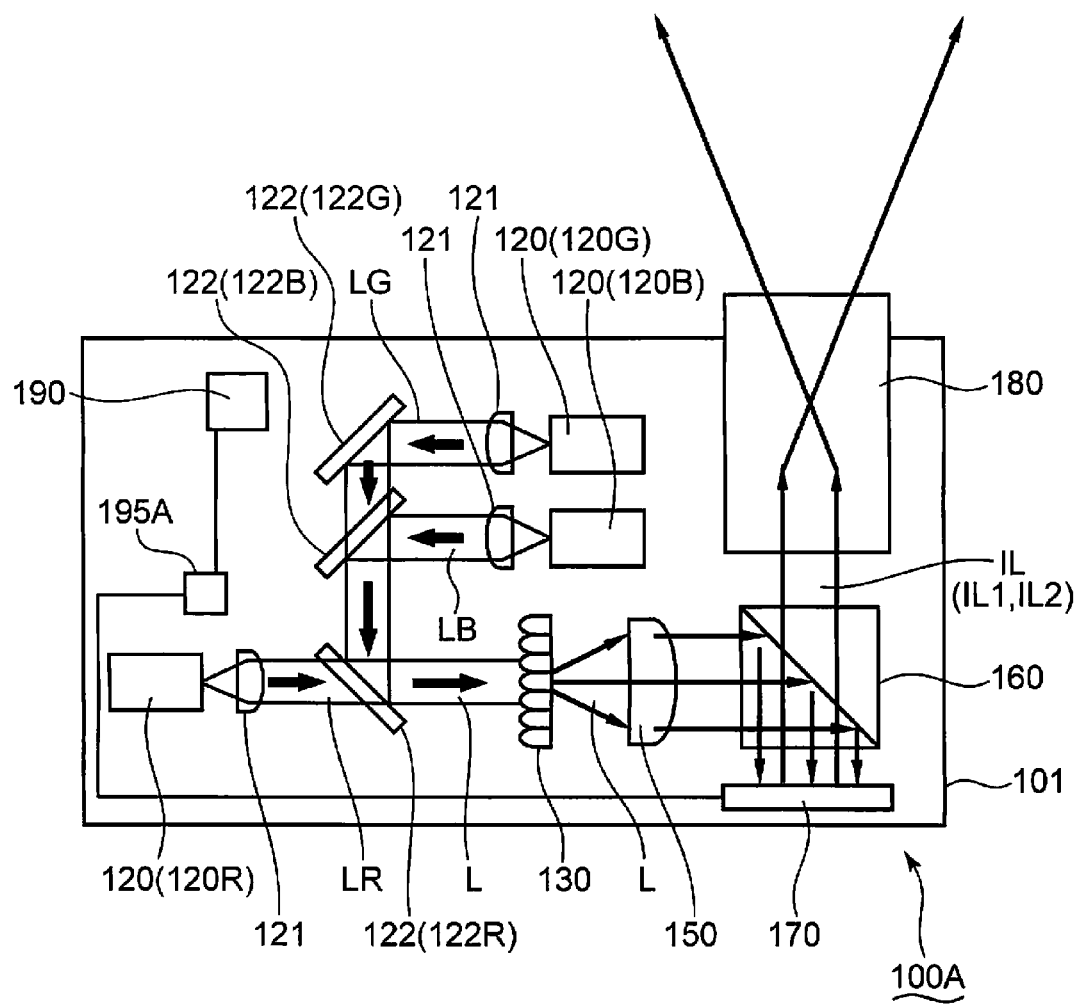
FIG. 4 is a schematic view showing a configuration of a projector according to the second embodiment.

FIG. 4 is a schematic view showing a configuration of a projector according to the second embodiment. Differences from the projector according to the first embodiment are described with reference to FIG. 4.

The projector 100A according to the second embodiment has a controller 195A and a reflective type liquid crystal panel 170A in addition to the housing 101, the laser light source 120, the collimate lens 121, the mirror element 122, the diffusion plate 130, the field lens 150, the polarization beam splitter 160, the projection lens 180 and the acceleration sensor 190, which are described in the context of the first embodiment.

In the present embodiment, the controller 195A controls the liquid crystal panel 170A in response to the detection signals output from the acceleration sensor 190. If the projector 100A moves at an acceleration less than the threshold, or remains stationary, the controller 195A drives the liquid crystal panel 170A in response to the image signals which are input to the projector 100A. As a result, the image light IL generated by driving the liquid crystal panel 170A is projected from the housing 101 via the polarization beam splitter 160 and the projection lens 180. If the projector 100A moves at an acceleration exceeding the threshold (second acceleration), the controller 195A outputs the control signals to the liquid crystal panel 170A to stop generating the image light IL or decrease the power of the image light IL in response to the image signal. As a result, the power of the image light IL emitted from the projection lens 180 is decreased or becomes "0".

Third Embodiment

The image light emission from the projector may be stopped by a shutter mechanism. The halt of the image light emission by means of the shutter mechanism is described in the third embodiment.

Figure 5:
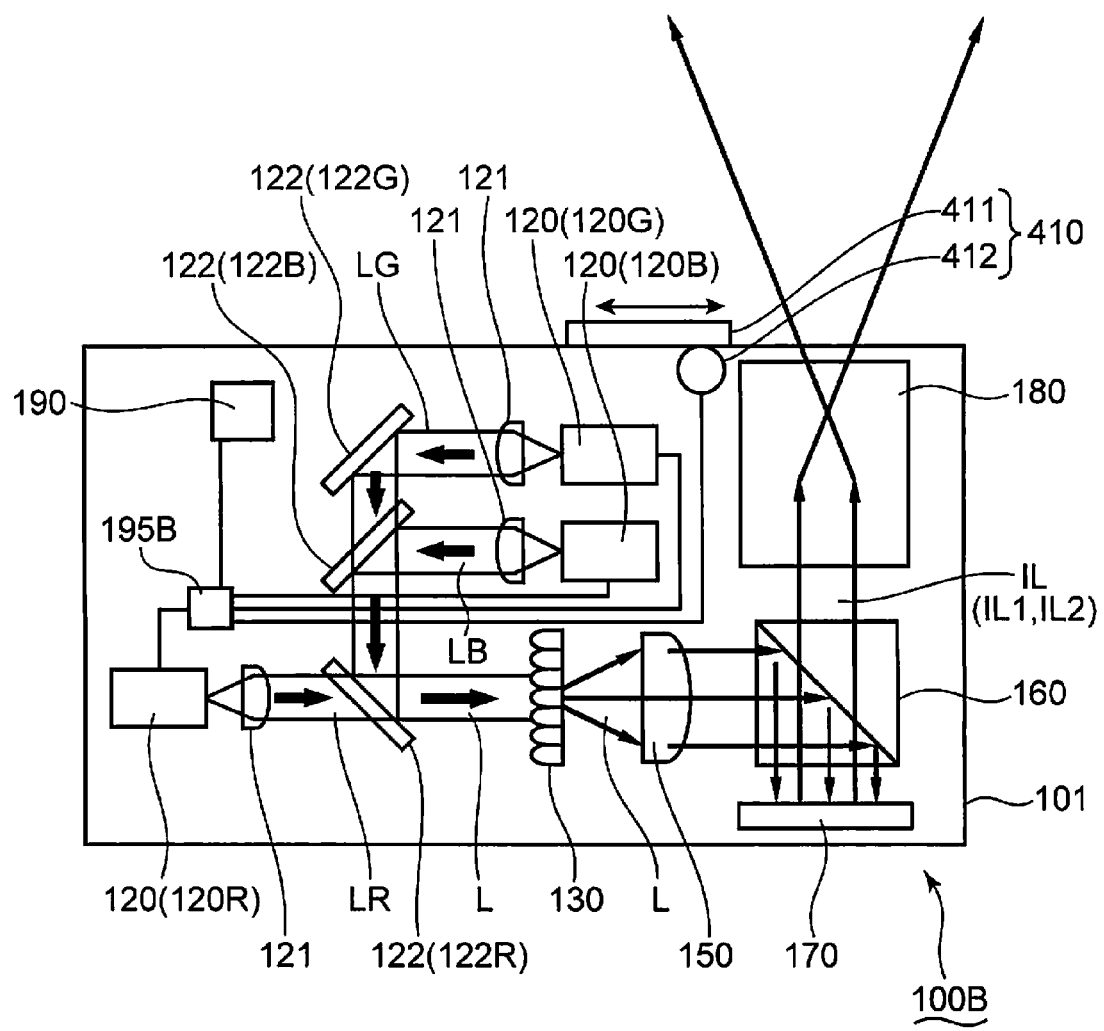
FIG. 5 is a schematic view showing a configuration of a projector according to the third embodiment.

FIG. 5 is a schematic view showing a configuration of a projector according to the third embodiment. Differences from the projector according to the first embodiment are described with reference to FIG. 5.

The projector 100B according to the third embodiment has a controller 195B and a shutter mechanism 410, in addition to the housing 101, the laser light source 120, the collimate lens 121, the mirror element 122, the diffusion plate 130, the field lens 150, the polarization beam splitter 160, the liquid crystal panel 170, the projection lens 180 and the acceleration sensor 190, which are described in the context of the first embodiment.

The shutter mechanism 410 includes a shutter plate 411, which is mounted on the outer surface of the housing 101, and a drive motor 412, which drives the shutter plate 411. The drive motor 412 under the control of the controller 195B moves the shutter plate 411 between an open position, where the optical path of the image light IL projected from the projection lens 180 is opened, and a close position, where the optical path of the image light IL projected from the projection lens 180 is closed. In the present embodiment, the shutter mechanism 410 is exemplified as the shutter. The shutter plate 411 shown in FIG. 5 is at the open position.

Figure 6:
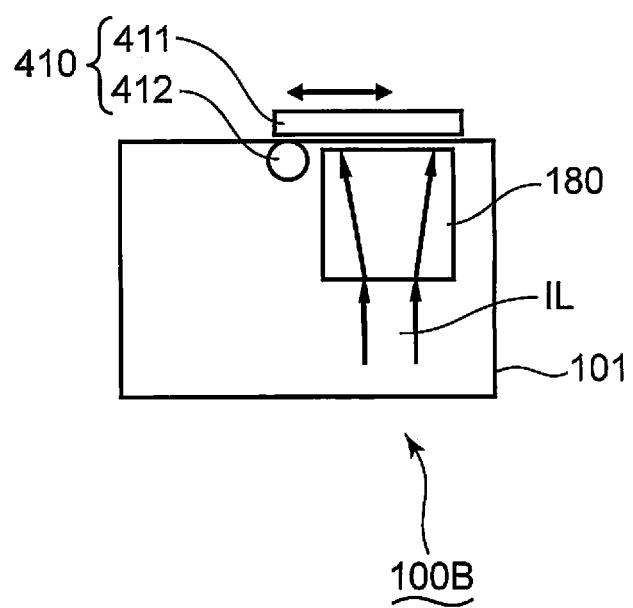
FIG. 6 is a schematic view showing the projector shown in FIG. 5.

FIG. 6 is a schematic view showing the projector 100B with the shutter plate 411 at the close position. The projector 100B is further described with reference to FIGS. 5 and 6.

In the present embodiment, the controller 195B controls the drive motor 412 in response to the detection signals output from the acceleration sensor 190. If the projector 100B moves at an acceleration less than the threshold (first acceleration) or remains stationary, the controller 195B outputs the control signal to the drive motor 412 to move the shutter plate 411 to the open position. The controller 195B preferably makes the laser light source 120 emit the laser beam L before the movement of the shutter plate 411 to the open position. Thus, the image light IL, which is generated by the liquid crystal panel 170 modulating the laser beam L, is irradiated to the inner surface of the shutter plate 411 immediately before the movement of the shutter plate 411 to the open position. As the shutter plate 411 moves to the open position, an amount of the image light IL emitted from the housing 101 gradually increases. Accordingly, it becomes less likely that the image light IL is suddenly emitted from the projector 100B at high power without expectation of the emission by a user or a viewer around the projector 100B. Thus, the projector 100B is safely operated.

If the projector 100B moves at an acceleration exceeding the threshold (second acceleration), the controller 195B outputs the control signal to the drive motor 412 to move the shutter plate 411 to the close position. The shutter plate 411 stops emitting the image light IL during the highly accelerated displacement of the projector 100B to make the projector 100B highly safe.

Fourth Embodiment

It is preferable that the output and halt of the image light from the projector are controlled on the basis of user's intention to operate the projector. A projector described in the fourth embodiment includes an operation portion which the user operates to instruct the output and halt of the image light.

Figure 7:
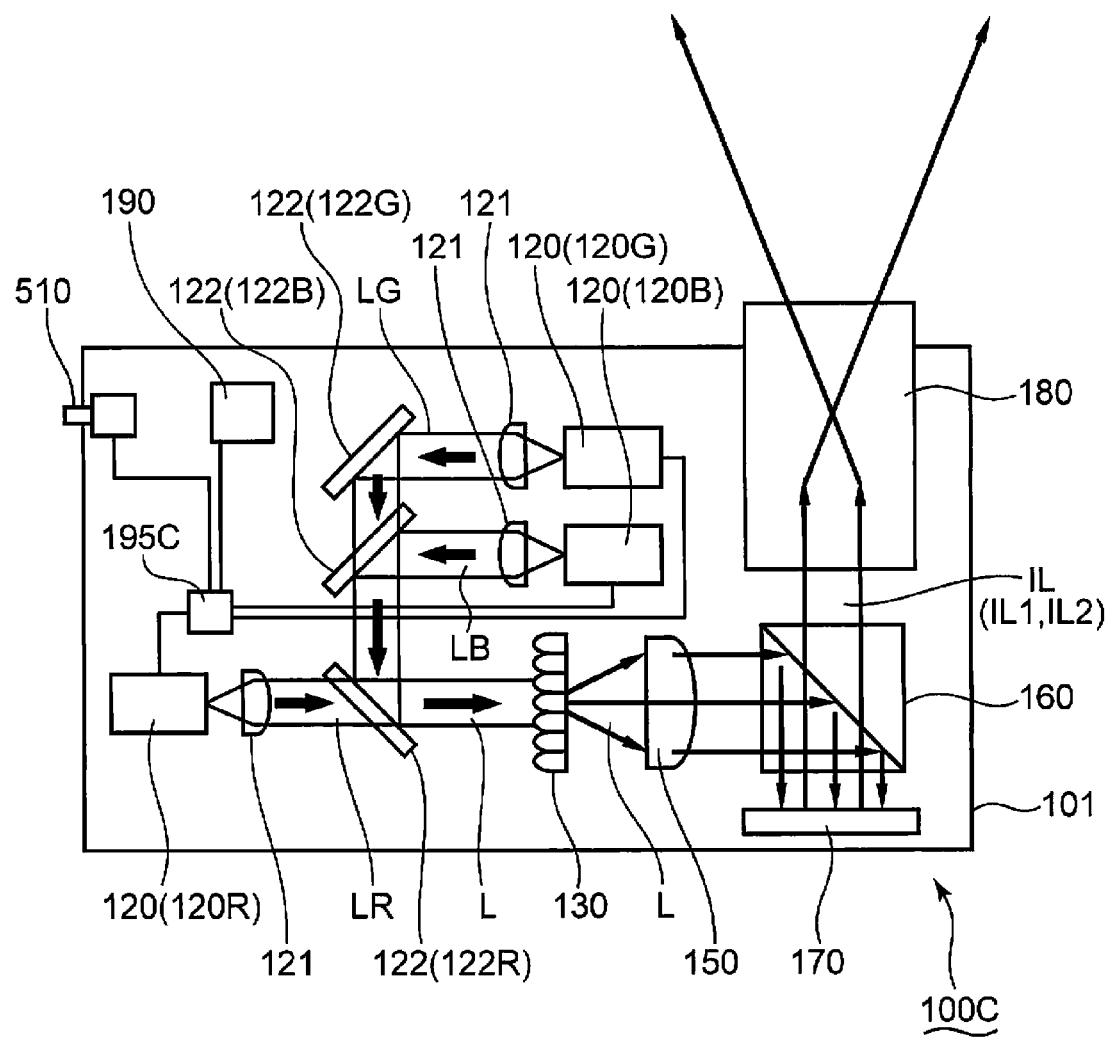
FIG. 7 is a schematic view showing a configuration of a projector according to the fourth embodiment.

FIG. 7 is a schematic view showing a configuration of a projector according to the fourth embodiment. Differences from the projector according to the first embodiment are described with reference to FIG. 7.

The projector 100C according to the fourth embodiment has a controller 195C and an operation switch 510, besides the housing 101, the laser light source 120, the collimate lens 121, the mirror element 122, the diffusion plate 130, the field lens 150, the polarization beam splitter 160, the liquid crystal panel 170, the projection lens 180 and the acceleration sensor 190, which are described in the context of the first embodiment. A user may operate the operation switch 510 to make the projector 100C output and/or stop the image light IL. The operation switch 510 is exemplified as the operation portion in the present embodiment.

The controller 195C controls the laser light source 120 in response to the detection signals output from the acceleration sensor 190. Control of the laser light source 120 by the controller 195C without operation of the operation switch 510 by the user is the same as the controller 195 described in the context of the first embodiment. Therefore, if the projector 100C moves at an acceleration less than the threshold (first acceleration) or remains stationary, the controller 195C emits the laser beam L from the laser light source 120. If the projector 100C moves at an acceleration exceeding the threshold (second acceleration), the controller 195C stops emitting the laser beam L from the laser light source 120.

Figure 8:
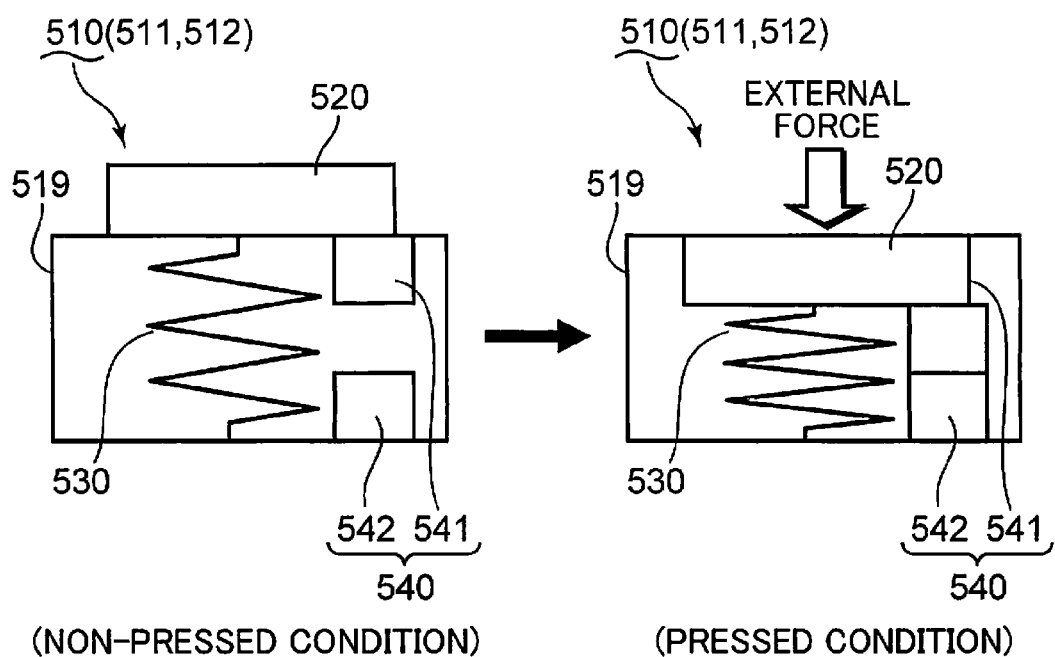
FIG. 8 is a schematic view showing an operation switch of the projector shown in FIG. 7.

FIG. 8 is a schematic view showing the operation switch 510. The operation switch 510 is described with reference to FIGS. 7 and 8.

The right-hand picture in FIG. 8 shows the operation switch 510 under a pressed condition where a user applies an external force. The left-hand picture in FIG. 8 shows the operation switch 510 under a non-pressed condition where the user removes the external force.

The operation switch 510 includes a housing 519, a spring 530 (elastic member) stored in the housing 519 and a pressure button 520 which is elastically supported by the spring 530. If the user presses the pressure button 520, the pressure button 520 is depressed into the housing 519. If the user removes the external force, the spring 530 extends to protrude the pressure button 520 from the housing 519.

The operation switch 510 also has a switch electrode 540. The switch electrode 540 includes a first electrode 541 which moves with the pressure button 520 and a second electrode 542 which faces the first electrode 541. Without an external force applied to the pressure button 520, the spring 530 extends to separate the first electrode 541 from the second electrode 542. If the external force is applied to the pressure button 520, the spring 530 is compressed to make the first electrode 541 contact with the second electrode 542 and cause conduction between the first and second electrodes 541, 542. If the first and second electrodes 541, 542 contact to each other, an operation signal is output from the operation switch 510 to the controller 195C.

If the operation signal is output from the operation switch 510 to the controller 195C, the controller 195C projects the image light IL, which is generated by the liquid crystal panel 170 modulating the laser beam L, from the projector 100C, independently of the acceleration of the projector 100C, which is detected by the acceleration sensor 190.

For example, if the user presses the pressure button 520 with the finger, (i.e. if the external force is applied to the pressure button 520), the first electrode 541 contacts the second electrode 542. If the user releases the finger from the pressure button 520, the first electrode 541 is disconnected from the second electrode 542.

As described above, if the projector 100C moves at a higher acceleration than the threshold (second acceleration), the controller 195C makes laser light source 120 stop emitting the laser beam L. If the user, however, wants to emit the image light IL from the projector 100C, independently of a magnitude of acceleration detected by the acceleration sensor 190, the user may continue pressing the pressure button 520 to project the image light IL. The controller 195C continues or stops projecting the image light IL in response to the acceleration of the projector 100C if the user then removes the finger from the pressure button 520. Thus, the user's intention (instruction about projection or its halt of the image light IL from the projector 100C) is preferably reflected even under the projection control of the image light IL in response to the acceleration detected by the acceleration sensor 190. Since the user's intention is preferably reflected on the projection or its halt of the image light IL from the projector 100C, it becomes easy to handle the projector 100C.

The controller 195C may measure an elapsed time after the operation signal is input from the operation switch 510. The controller 195C may control the laser light source 120 in response to the acceleration of the projector 100C, so that the image light IL is emitted in a certain power range, in which the image light IL is harmless to the user and/or viewers around the projector 100, in a predetermined period after the operation signal is input from the operation switch 510 (hereinafter called a first period: e.g. 10 second period). Alternatively, the controller 195C may control the laser light source 120 in the first period, so that the power of the image light IL gradually increases with time in the power range in which the image light IL is harmless to the user and/or viewers around the projector 100.

The controller 195C may control the red and blue laser light sources 120R, 120B to stop emitting the red and blue laser beams LR, LB in the first period, respectively. The controller 195C decreases and sets the power of the green laser beam LG, of which wavelength is 515 Nm to 540 nm, to the second power, which is harmless for the eyes of the user and viewers. As a result, the projector 100 C emits image light IL2 of the green laser beam LG at the second power.

The green laser beam LG, which is 515 nm to 540 nm in wavelength, has higher luminous efficiency than the red and blue laser beams LR, LB. For example, the green laser beam, which is 532 nm in wavelength, has about five times as high luminous efficiency as the red laser beam which is 640 nm in wavelength. The green laser beam, which is 532 nm in wavelength, is about thirty times as high luminous efficiency as the blue laser beam which is 445 nm in wavelength. Thus, even under the same power of the laser beam, the green laser beam appears to be brighter to the eyes of the user and viewers. As a result, a bright image is displayed even under a low power of the laser beam.

Figure 9:
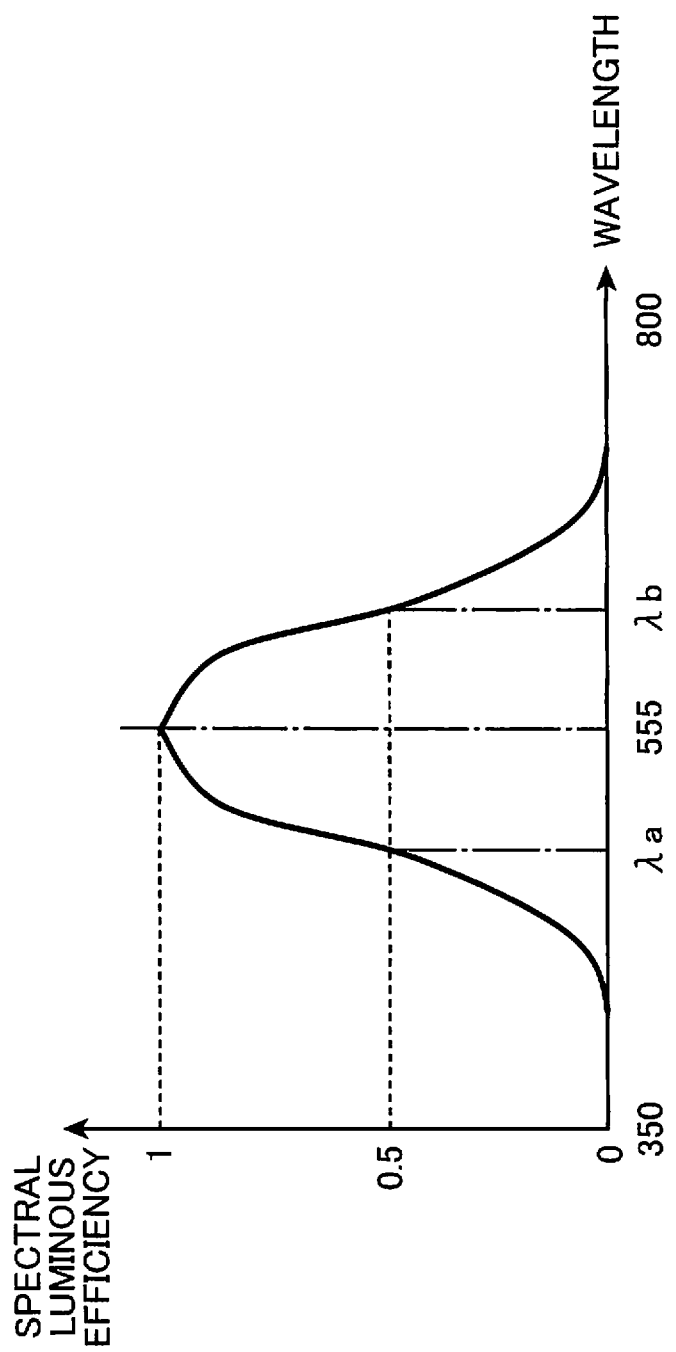
FIG. 9 is a graph showing a relationship between wavelengths of the laser beam and spectral luminous efficiency.

FIG. 9 is a graph showing a relationship between wavelengths of the laser beam and the spectral luminous efficiency. The selective output of the laser beam in the first period is described with reference to FIGS. 7 and 9.

According to the present embodiment, in the first period where the power of the image light IL is set to the second power, the controller 195C stops driving the red and blue laser light sources 120R, 120B with keeping the drive of the green laser light source 120G configured to emit the green laser beam LG, which is 515 nm to 540 nm in wavelength, so that an image is displayed or depicted in the first period by the green laser beam LG which is 515 nm to 540 nm in wavelength, although the wavelength of the laser beam selectively emitted in the first period is not limited to a 515 nm to 540 nm range. As shown in FIG. 9, a laser beam, of which wavelength is in a range from λa to λb (λa<λb), is emitted in the first period to achieve spectral luminous efficiency no less than "0.5". If the wavelength range to achieve the spectral luminous efficiency over "0.5" is used, the displayed image becomes bright even under the low power of the laser beam.

Operations of the projector 100C in association with the operation of the operation switch 510 are described with reference to FIGS. 7 and 8.

Once the pressure button 520 is pressed, the image light IL2, which is generated by the liquid crystal panel modulating the laser beam L, is projected from the projector 100C at the second power, independent of the acceleration of the projector 100C detected by the acceleration sensor 190, as mentioned above. Even if the external force is removed from the pressure button 520, the controller 195C may control the laser light source 120 so as to continue the projection of the image light IL2 from the projection lens 180 at the second power. The controller 195C may control the laser light source 120 so as to stop projecting the image light IL if the first period passes. Alternatively, the controller 195C may control the laser light source 120 so as to stop projecting the image light IL as soon as the external force is removed from the pressure button 520.

If the projector 100C continues the projection of the image light IL2 at the second power for a predetermined period after the pressure button 520 is pressed, the user and viewers around the projector 100C may recognize the projection position and the projection direction of the image light IL since an area where the image light IL is irradiated becomes bright. Thus, even if the user accidentally presses the pressure button 520, the image light IL at a high power level is not suddenly emitted from the projector 100C, which makes the projector 100C highly safe.

If the external force is continuously applied to the pressure button 520 during a predetermined period (hereinafter called "second period"), the controller 195C may switch operation mode of the projector 100C to project the image light IL1 from the projection lens 180 at the first power. For example, if the pressure button 520 is continuously pressed during the second period (e.g. 10 seconds), the controller 195C may control the red and blue laser light sources 120R, 120B to restart emitting the red and blue laser beams LR, LB. The controller 195C controls the red and blue laser light sources 120R, 120B to set the power of the image light IL to the first power and appropriately adjust brightness of the displayed image.

According to the present embodiment, in the first period, the controller 195C continues driving the green laser light source 120G during the drive halt of the red and blue laser light sources 120R, 120B, as mentioned above. Currently, it is difficult to obtain practical and suitable materials for a semiconductor laser which emits a green laser beam at high power. Under the aforementioned circumstance, a wavelength conversion type green laser light source has been proposed and developed for mass production as a laser light source configured to emit a green laser beam at high power. A wavelength conversion type laser light source is suitable for the green laser light source 120G described in the present embodiment.

Figure 10:
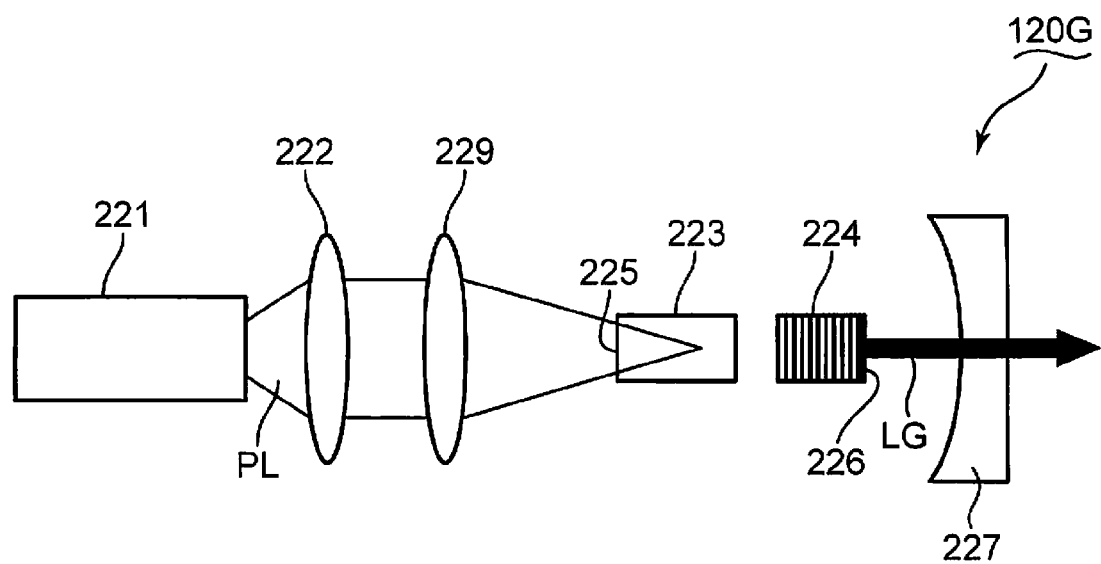
FIG. 10 is a schematic view showing a green laser light source shown in FIG. 7.

FIG. 10 is a schematic view showing the green laser light source 120G. The green laser light source 120G is described with reference to FIGS. 7 and 10.

The green laser light source 120G has an excitation light source 221 which causes excitation light PL, a collimate lens 222 which substantially collimates the excitation light PL from the excitation light source 221, and laser medium 223 which causes fundamental wave light in response to the excitation light PL. The green laser light source 120G also has a collective lens 229 between the collimate lens 222 and the laser medium 223. The collective lens 229 collects the excitation light PL collimated by the collimate lens 222 to the laser medium 223. If the excitation light PL is collected by the collective lens 229, for example, the laser medium 223 causes the fundamental wave light which is a 1060 nm band in wavelength.

The green laser light source 120G also has a wavelength converter 224 which converts the wavelength of the fundamental wave light generated by the laser medium 223 into a wavelength of the green laser beam LG. The laser medium 223 includes an incident end surface 225 to which the excitation light PL enters. The wavelength converter 224 also has an emission end surface 226 from which the green laser beam LG is emitted. An optical film (not shown) which highly reflects light in a 1060 nm band is formed on the incident end surface 225 of the laser medium 223. An optical film (not shown) which highly reflects the light in the 1060 nm band is also formed on the emission end surface 226 of the wavelength converter 224. Thus, an optical resonator is formed between the incident end surface 225 of the laser medium 223 and the emission end surface 226 of the wavelength converter 224. The light in the 1060 nm band repeats reflection in the resonator to oscillate the laser beam in the 1060 nm band. Then, the laser beam in the 1060 nm band passes through the wavelength converter 224, which converts the wavelength to cause the green laser beam LG in the 530 nm band.

The green laser light source 120G may have an output lens 227. The green laser beam LG is emitted toward the mirror 122G via the output lens 227.

A change in output due to a temperature of the green laser light source 120G (called "temperature characteristics" hereinafter) shown in FIG. 10 is largely different from those of red and blue semiconductor laser light sources, which are used as the red and blue laser light sources 120R, 120B, respectively.

The temperature characteristics of the red or blue semiconductor laser light source greatly depend on the change in temperature of the semiconductor laser light source itself. In general, if the temperature of the semiconductor laser light source changes from a low temperature to a high temperature, output from the semiconductor laser light source simply goes down whereas an output level of the wavelength conversion type green laser light source 120G shown in FIG. 10 is influenced not only by the change in output of the semiconductor laser which is used as the excitation light source 221 but also by the change in temperature of the wavelength converter 224.

For example, if an operational range of the wavelength converter 224 is from around room temperature 20° C. to 40° C., the output of the green laser light source 120G, which is used under an environment no more than 20° C., considerably decreases. For example, if the projector 100C is used under a 10° C. temperature environment, a user has to wait until the temperature of the wavelength converter 224 becomes no less than 20° C. Meanwhile, the green laser beam LG does not reach a power level high enough to display images (first power). Therefore, the user and viewers may view a green image with low brightness.

According to the present embodiment, if the acceleration sensor 190 detects the acceleration of the projector 100C exceeding the threshold, the controller 195C continues driving the green laser light source 120G during the drive halt of the red and blue laser light sources 120R, 120B, as mentioned above. As a result, the temperature of the green laser light source 120G may quickly and safely increase. Consequently, the projector 100C may quickly display a bright image.

According to the present embodiment, the operation switch 510 includes the spring 530 to bias the first electrode 541 upward and separate the first electrode 541 from the second electrode 542. Alternatively, other elements configured to separate the first electrode 541 from the second electrode 542 may be used instead of the spring 530. For example, a magnet may be used instead of the spring 530, so that the first and second electrodes 541, 542 are disconnected by the magnetic force of the magnet. A coil may be used instead of the spring 530, so that the first and second electrodes 541, 542 are disconnected by an electromagnetic induction function.

Fifth Embodiment

A projector may have handful switch elements as the operation switch to instruct projection and its halt of the image light on the basis of the user's intention. The projector with the switch elements is described in the fifth embodiment.

Figure 11:
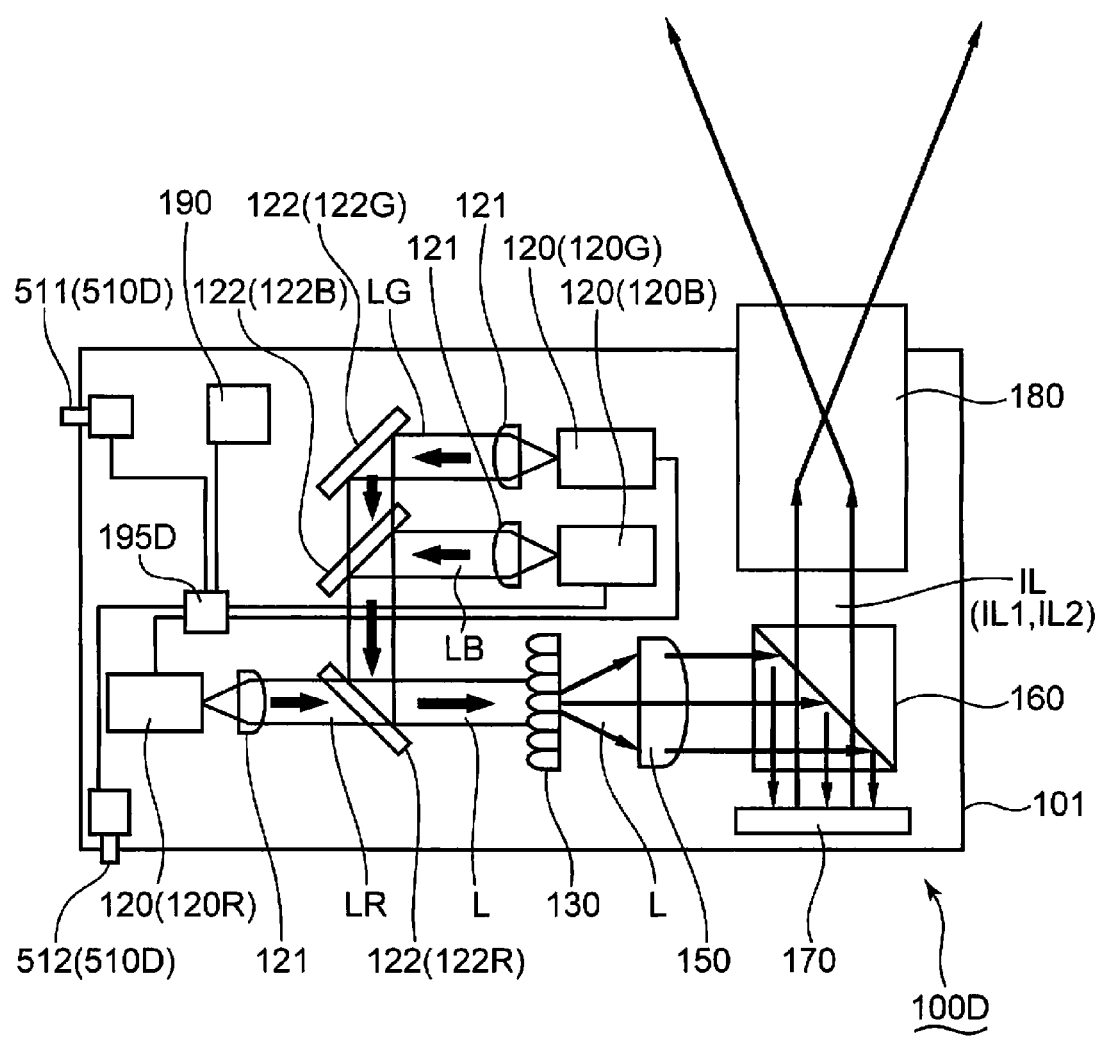
FIG. 11 is a schematic view showing a configuration of a projector according to the fifth embodiment.

FIG. 11 is a schematic view showing a configuration of a projector according to the fifth embodiment. Differences from the projector according to the fourth embodiment are described with reference to FIGS. 8 and 11.

The projector 100D according to the fifth embodiment includes the housing 101, the laser light source 120, the collimate lens 121, the mirror element 122, the diffusion plate 130, the field lens 150, the polarization beam splitter 160, the liquid crystal panel 170, the projection lens 180 and the acceleration sensor 190, like the projector 100C described in the context of the fourth embodiment. The projector 100D further comprises an operation switch 510D which includes a first switch 511 and a second switch 512. The first and second switches 511, 512 are mounted at different places of the housing 101. The first and second switches 511, 512 may have the spring structure described with reference to FIG. 8.

The projector 100D also has a controller 195D which controls the laser light source 120 in response to the detection signals from the acceleration sensor 190. Control of the laser light source 120 by the controller 195D without the operation switch 510D operated by a user is the same as the controller 195C described in the context of the fourth embodiment. If the projector 100D moves at a lower acceleration than the threshold (first acceleration) or remains stationary, the controller 195D makes the laser light source 120 emit the laser beam L. If the projector 100D moves at an acceleration exceeding the threshold (second acceleration), the controller 195D makes the laser light source 120 stop emitting the laser beam L.

According to the present embodiment, if external force is applied to both of the first and second switches 511, 512 almost simultaneously (i.e. if there are the contact between the first and second electrodes 541, 542 of the first and second switches 511, 512), the controller 195D drives the laser light source 120 (e.g. green laser light source 120G) to project the image light IL2 from the projection lens 180 at the second power. The controller 195D does not drive the laser light source 120 if the external force is applied only to one of the first and second switches 511, 512.

It is unlikely that both the first and second switches 511, 512 are pressed almost simultaneously without user's intention. Thus, it becomes less likely that the user mistakenly operates the operation switch 510D to cause unintentional projection of the image light IL from the projector 100D according to the present embodiment. It becomes not only easy but also safe to project the image light IL from the projector 100D under the intention of the user.

The projection 100D according to the present embodiment has the first and second switches 511, 512. It is preferable that the first switch 511 is apart from the second switch 512. As a result, it is unlikely that the user unintentionally operates the first and second switches 511, 512. Therefore, the projector 100D is safely operated.

As shown in FIG. 11, it is preferable that the first and second switches 511, 512 are not mounted on the same plane, but on different planes of the housing 101. Unless the first and second switches 511, 512 are on the same plane, a user is less likely to operate both the first and second switches 511, 512 with one hand. Therefore, the user has to use both hands to operate the first and second switches 511, 512. Since the projector 100D requires the user to use both hands to operate the first and second switches 511, 512, the user carefully projects the image light IL from the projector 100D. As a result, the projector 100D is safely operated.

The minimum distance between the first and second switches 511 is preferably no less than 200 mm. It becomes difficult for the user to operate the first and second switches 511, 512 by a single hand if the distance is no less than 200 mm. Thus, the user uses both hands to press the first and second switches 511, 512. Since the projector 100D requires the user to use both hands to operate the first and second switches 511, 512, the user carefully projects the image light IL from the projector 100D, which results in safe operation of the projector 100D.

Sixth Embodiment

Elements which detect the fixation degree of the projector are not limited to the aforementioned acceleration sensor. A projector described in the sixth embodiment has a placement switch as the detector to detect whether the projector is placed on a supporting surface configured to support the projector (e.g. a surface of a table).

Figure 12:
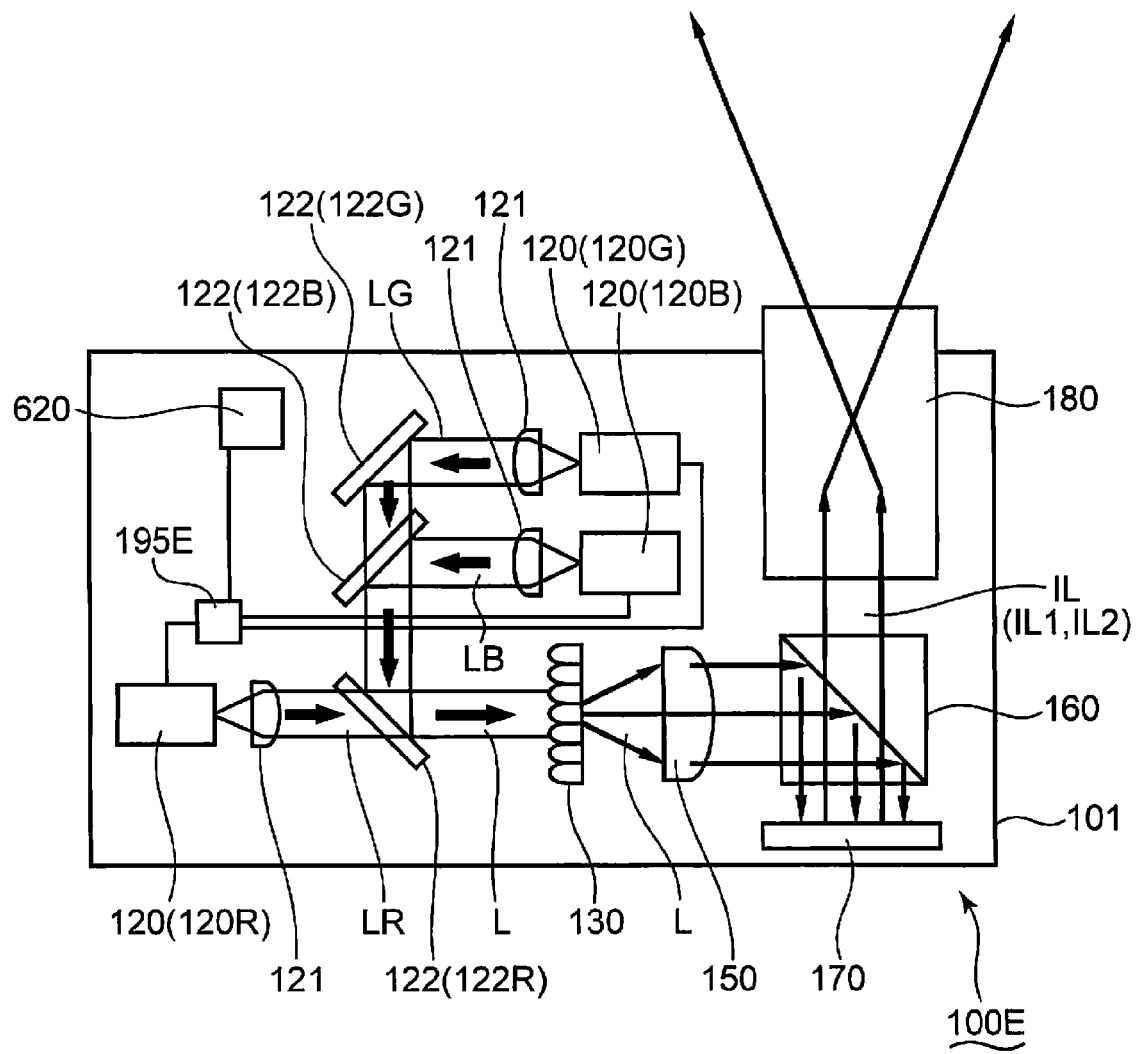
FIG. 12 is a schematic view showing a configuration of a projector according to the sixth embodiment.

FIG. 12 is a schematic view showing a configuration of a projector according to the sixth embodiment. Differences from the projector according to the first embodiment are described with reference to FIG. 12.

The projector 100E according to the sixth embodiment includes the housing 101, the laser light source 120, the collimate lens 121, the mirror element 122, the diffraction plate 130, the field lens 150, the polarization beam splitter 160, the liquid crystal panel 170 and the projection lens 180, which are described in the context of the first embodiment. The projector 100E further includes a gravity switch 620 as the detector which detects whether the projector 100E is placed on a supporting surface configured to support the projector 100E (e.g. a surface of a table). In the present embodiment, the gravity switch 620 is exemplified as the placement switch.

Figure 13:
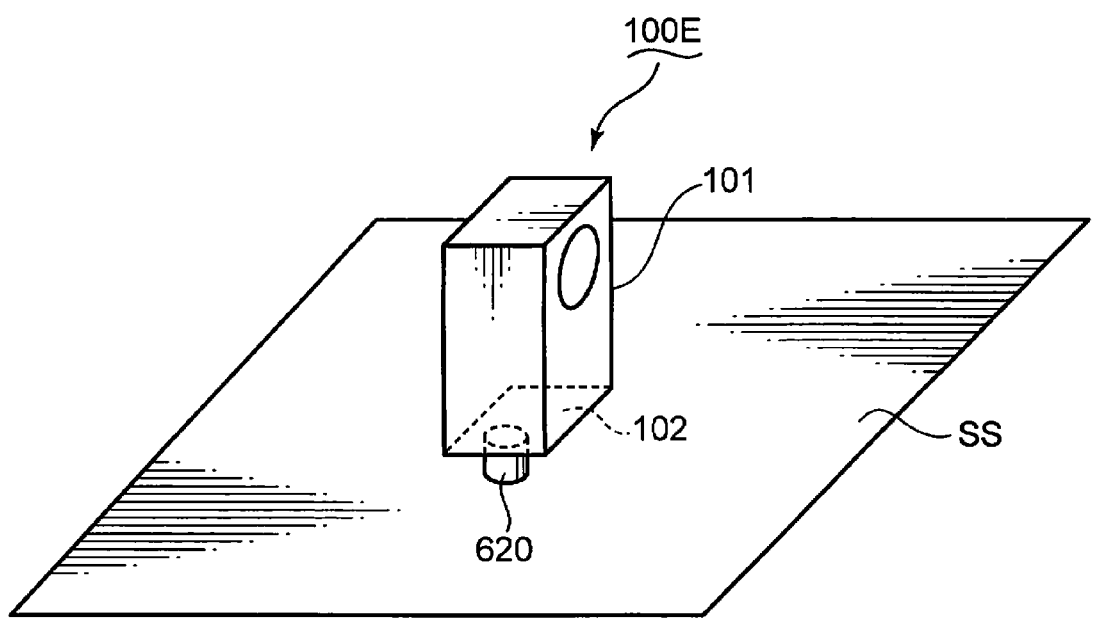
FIG. 13 is a schematic perspective view showing the projector shown in FIG. 12.

FIG. 13 is a schematic perspective view of the projector 100E. The projector 100E is further described with reference to FIGS. 12 and 13.

The housing 101 includes a bottom wall 102 which faces a supporting face SS if the projector 100E is placed on the supporting surface SS. The gravity switch 620 is preferably attached to the bottom wall 102 of the housing 101.

Figure 14:
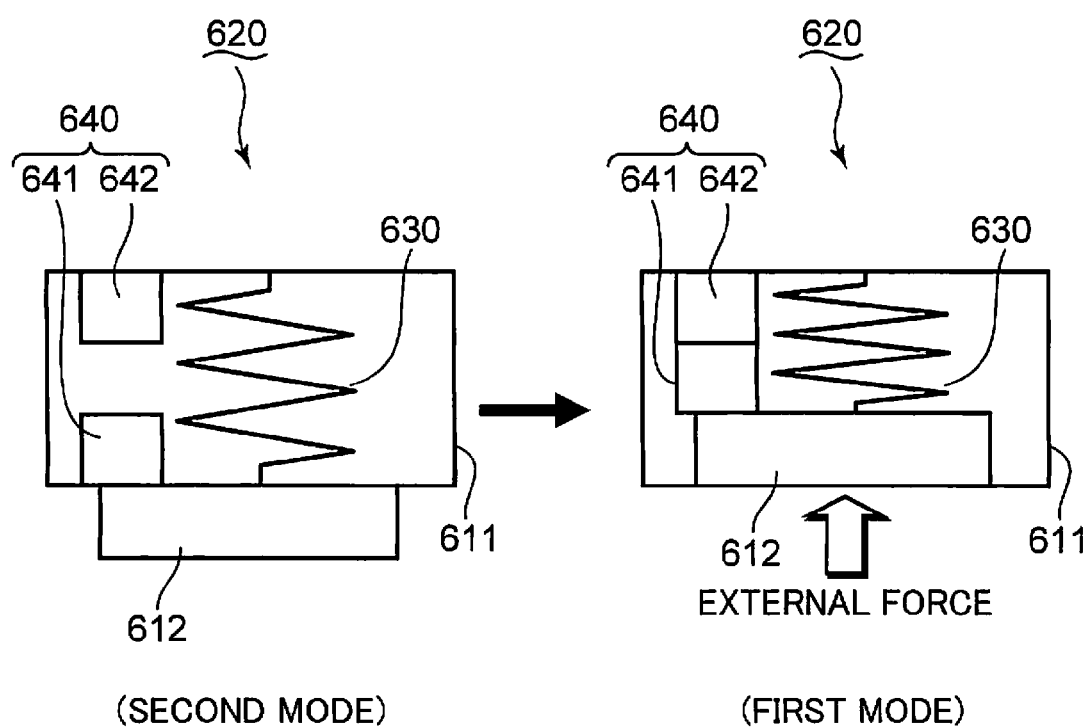
FIG. 14 is a schematic view showing a gravity switch of the projector shown in FIG. 12.

FIG. 14 is a schematic view showing the gravity switch 620. The gravity switch 620 is described with reference to FIGS. 12 to 14.

The right-hand picture in FIG. 14 shows the gravity switch 620 in a first mode in which the projector 100E is placed on the supporting surface SS. The left-hand picture in FIG. 14 shows the gravity switch 620 in a second mode in which the projector 100E is separated from the supporting surface SS.

The gravity switch 620 includes a housing 611, a spring 630 (elastic member) situated inside the housing 611, and a pressure button 612 which is elastically connected to the spring 630. If a user puts the projector 100E on the supporting surface SS, the pressure button 612 is depressed into the housing 611 by the weight of the projector 100E, so that the gravity switch 620 enters the first mode. If the user separates the projector 100E from the supporting surface SS, the spring 630 extends to protrude the pressure button 612 from the housing 611 (the gravity switch 620 becomes the second mode).

The gravity switch 620 further includes a switch electrode 640. The switch electrode 640 includes a bottom electrode 641 which moves with the pressure button 612 and a top electrode 642 which faces the bottom electrode 641. While the projector 100E is separated from the supporting surface SS, the spring 630 extends to separate the bottom electrode 641 from the top electrode 642. While the projector 100E is placed on the supporting surface SS, the spring 630 is compressed, so that the bottom electrode 641 contacts the top electrode 642 to cause conduction between the bottom and top electrodes 641, 642.

As FIG. 12 shows, the projector 100E also has a controller 195E which controls the laser light source 120 in response to the mode switching operation of the gravity switch 620. Under the contact between the bottom and top electrodes 641, 642, placement signals are output to the controller 195E to indicate that the projector 100E is placed on the supporting surface SS.

If the placement signal is input from the gravity switch 620, the controller 195E sets the power of the image light IL to the first power to display an image. Unless the placement signal is input from the gravity switch 620, the controller 195E sets the power of the image light IL to the second power which is lower than the first power (set to a power level which is harmless for the user and viewers around the projector 100E).

Without the placement signal input from the gravity switch 620, the controller 195E may control the laser light source 120 so as to stop outputting the laser beam L. Alternatively, without the placement signal input from the gravity switch 620, the controller 195E may continue driving the green laser light source 120G whereas the controller 195E stops driving the red and blue laser light sources 120R, 120B, which results in the low power emission of the laser beam LG from the green laser light source 120G. Thus, the projector 100E is safely operated.

According to the present embodiment, the gravity switch 620 is used as the placement switch. Alternatively, other elements configured to detect the placement of the projector on the supporting surface may be used as the placement switch. For example, an electrostatic sensor and a piezoelectric sensor may be suitably used as the placement switch. If the supporting surface is a magnetic member, a switch element with a magnet may be used as the placement switch. The magnetic force between the projector and the supporting surface may work to switch ON/OFF of the switch (switching between the first and second modes).

Seventh Embodiment

A projection direction of the image light may contribute to the safety of a projector. A projector described in the seventh embodiment projects the image light onto the supporting surface.

Figure 15:
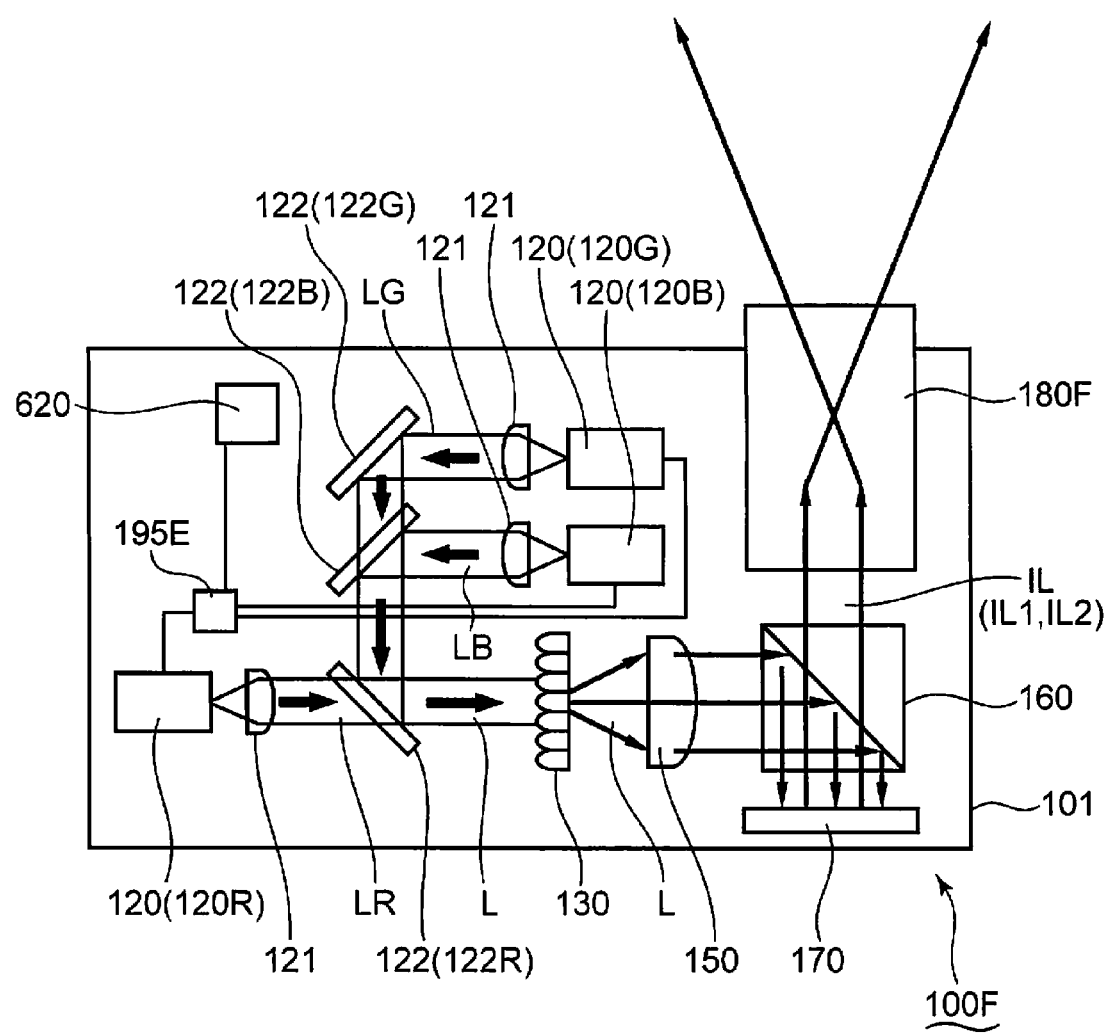
FIG. 15 is a schematic view showing a configuration of a projector according to the seventh embodiment.

FIG. 15 is a schematic view showing a configuration of the projector according to the seventh embodiment. Differences from the projector according to the sixth embodiment are described with reference to FIG. 15.

The projector 100F according to the seventh embodiment includes a projection lens 180F, in addition to the housing 101, the laser light source 120, the collimate lens 121, the mirror element 122, the diffusion plate 130, the field lens 150, the polarization beam splitter 160, the liquid crystal panel 170, the gravity switch 620 and the controller 195E, which are described in the context of the sixth embodiment. Like the projector 100E according to the sixth embodiment, the projector 100F projects the image light IL1 from the projection lens 180F at the first power to display a highly bright image if the projector 100F is placed on the supporting surface.

Figure 16:
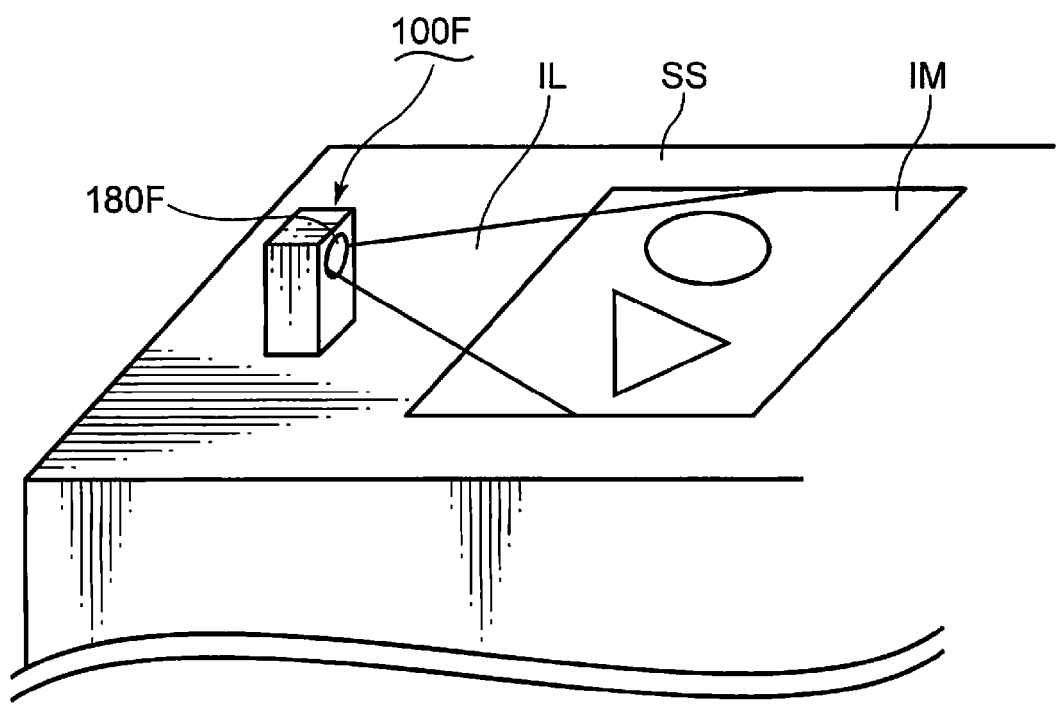
FIG. 16 is a schematic perspective view showing the projector shown in FIG. 15.

FIG. 16 is a schematic perspective view of the projector 100F placed on the supporting surface SS. The projector 100F is further described with reference to FIGS. 15 and 16.

The aforementioned various optical components (collimate lens 121, mirror element 122, diffusion plate 130, field lens 150, polarization beam splitter 160, liquid crystal panel 170 and projection lens 180F) in the housing 101 are designed so that the image light IL is projected from the projection lens 180F onto the supporting surface SS. Therefore, the image IM is projected onto the supporting surface SS.

According to the principles of the present embodiment, a space between the projection lens 180F and the image IM becomes narrow. Thus, it becomes less likely that the user and/or viewers enters their face in the space between the projection lens 180F and the image IM, which results in safe operation of the projector 100F.

According to the present embodiment, the gravity switch 620 is used as the placement switch. Alternatively, other elements configured to detect the placement of the projector on the supporting surface may be used as the placement switch. For example, an electrostatic sensor and a piezoelectric sensor may be suitably used as the placement switch.

Eighth Embodiment

If a projector captures a projected image, the projector may be safely operated. A projector described in the eighth embodiment has an image capture device configured to capture an image projected onto the supporting surface.

Figure 17:
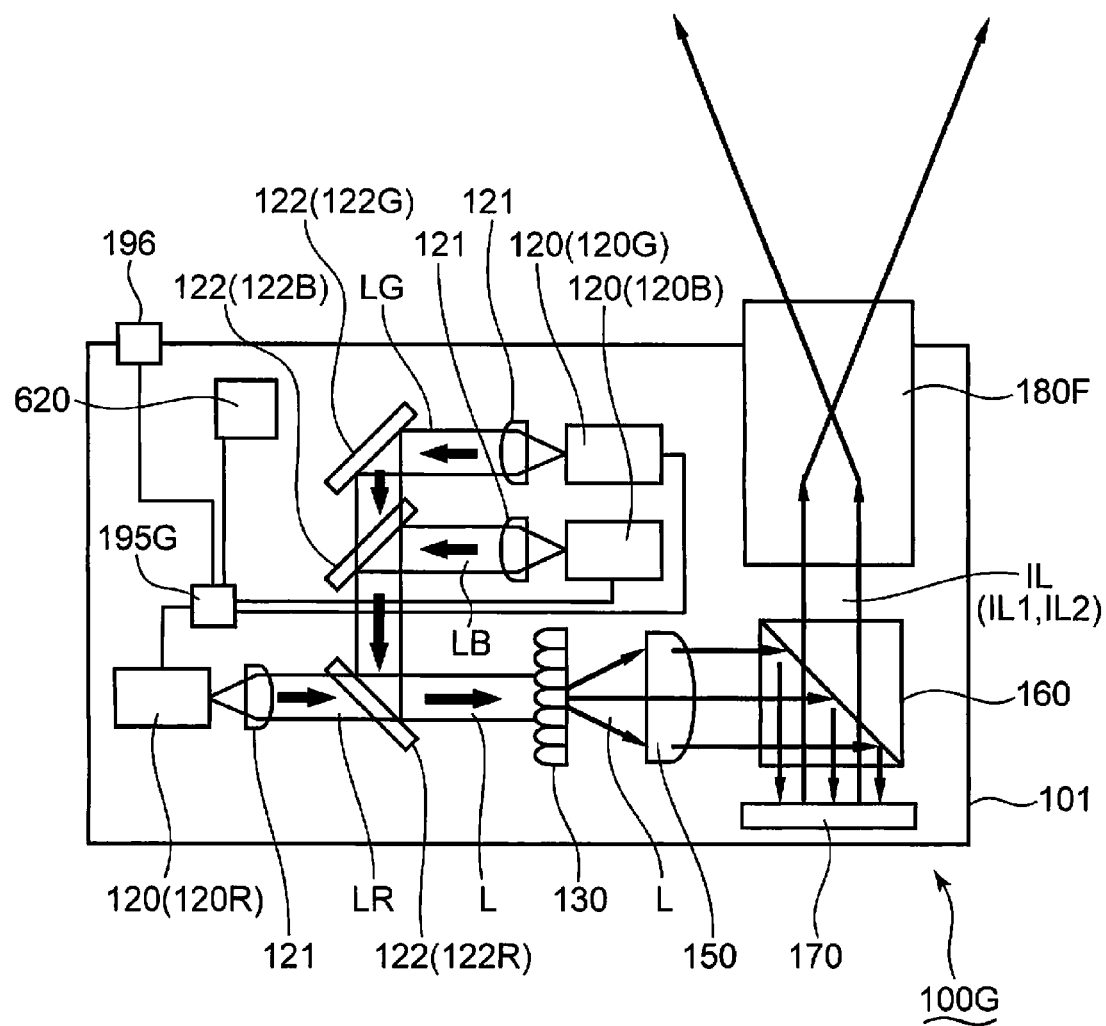
FIG. 17 is a schematic view showing a configuration of a projector according to the eighth embodiment.

FIG. 17 is a schematic view showing a configuration of the projector according to the eighth embodiment. Differences from the projector according to the seventh embodiment are described with reference to FIG. 17.

The projector 100G according to the eighth embodiment has a controller 195G and an image capture device 196, in addition to the housing 101, the laser light source 120, the collimate lens 121, the mirror element 122, the diffusion plate 130, the field lens 150, the polarization beam splitter 160, the liquid crystal panel 170, the gravity switch 620 and the projection lens 180F, which are described in the context of sixth embodiment. The controller 195G controls the laser light source 120 on the basis of not only the mode (first or second mode) of the gravity switch 620 but also the image data captured by the image capture device 196, which is used as the image capture element.

Figure 18:
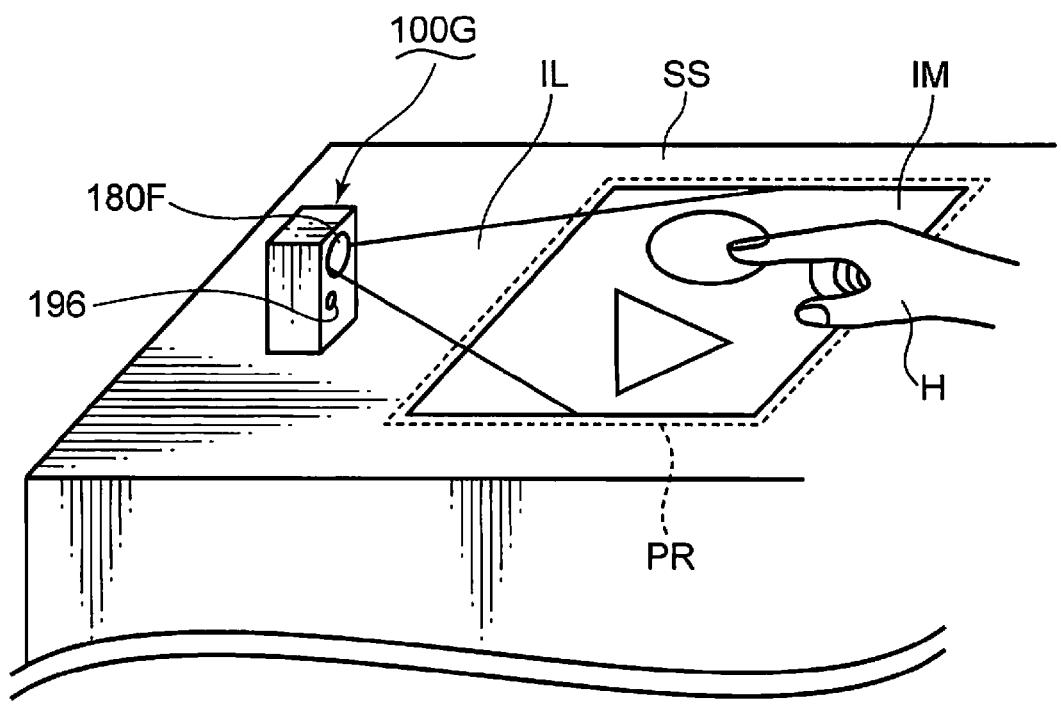
FIG. 18 is a schematic perspective view showing the projector shown in FIG. 17.

FIG. 18 is a schematic perspective view of the projector 100G placed on the supporting surface SS. The projector 100G is further described with reference to FIGS. 17 and 18.

As shown in FIG. 18, the image light IL is projected from the projection lens 180F onto the supporting surface SS, so that the image IM is displayed on the supporting surface SS. The image capture device 196 captures an image of the projected area PR where the image IM is displayed. The image capture device 196 then outputs the image data of the projected area PR to the controller 195G.

The controller 195G stores object data about a specific object. In the present embodiment, the controller 195G stores the object data about a human hand H.

If the gravity switch 620 enters the first mode and if the image capture device 196 outputs information about the hand H, the controller 195G controls the laser light source 120 to emit the image light IL1 at the first power, so that a highly bright image is displayed from the projection lens 180F. If the gravity switch 620 is in the second mode and/or unless the image capture device 196 outputs the information about the hand H, the controller 195G controls the laser light source 120 to emit the image light IL2 from the projection lens 180F at the second power, which is lower than the first power.

Optionally, the image capture device 196 and the controller 195G may function as a user interface to operate the projector 100G. For example, the controller 195G may obtain operation information such as a positional relationship between the image IM and the hand H, a moving direction of the hand H and a moving speed of the head H, on the basis of the image data. The controller 195G may control the liquid crystal panel 170 to polarize the displayed image IM on the supporting surface SS on the basis of the operation information.

The projector 100G according to the present embodiment, which emits the image light IL1 at the first power only when the user operates the projector 100G, may be easily and safely operated.

Unless the hand H of the user exists in the projection area PR, the controller 195G may control the laser light source 120 to stop projecting the image light IL. In this case, for example, light from an LED (not shown) or a lamp may be emitted to brighten the projection area. Alternatively, without the hand H of the user in the projection area PR, the controller 195G may control the laser light source 120 so as to emit image light IL2 at the second power which is harmless for the user and viewers around the projector 100G. For example, the controller 195G may continue driving the green laser light source 120G whereas the controller 195G stops driving the red and blue laser light sources 120R, 120B.

Ninth Embodiment

A compact projector may be fabricated by using the laser light source. Therefore, the projector may be integrated into another apparatus such as a personal computer. The compact projector, which is carried by the user, may be stored in a protective cover configured to protect the projector. A projector described in the ninth embodiment has a cover such as a housing of another apparatus and a protective cover.

Figure 19:
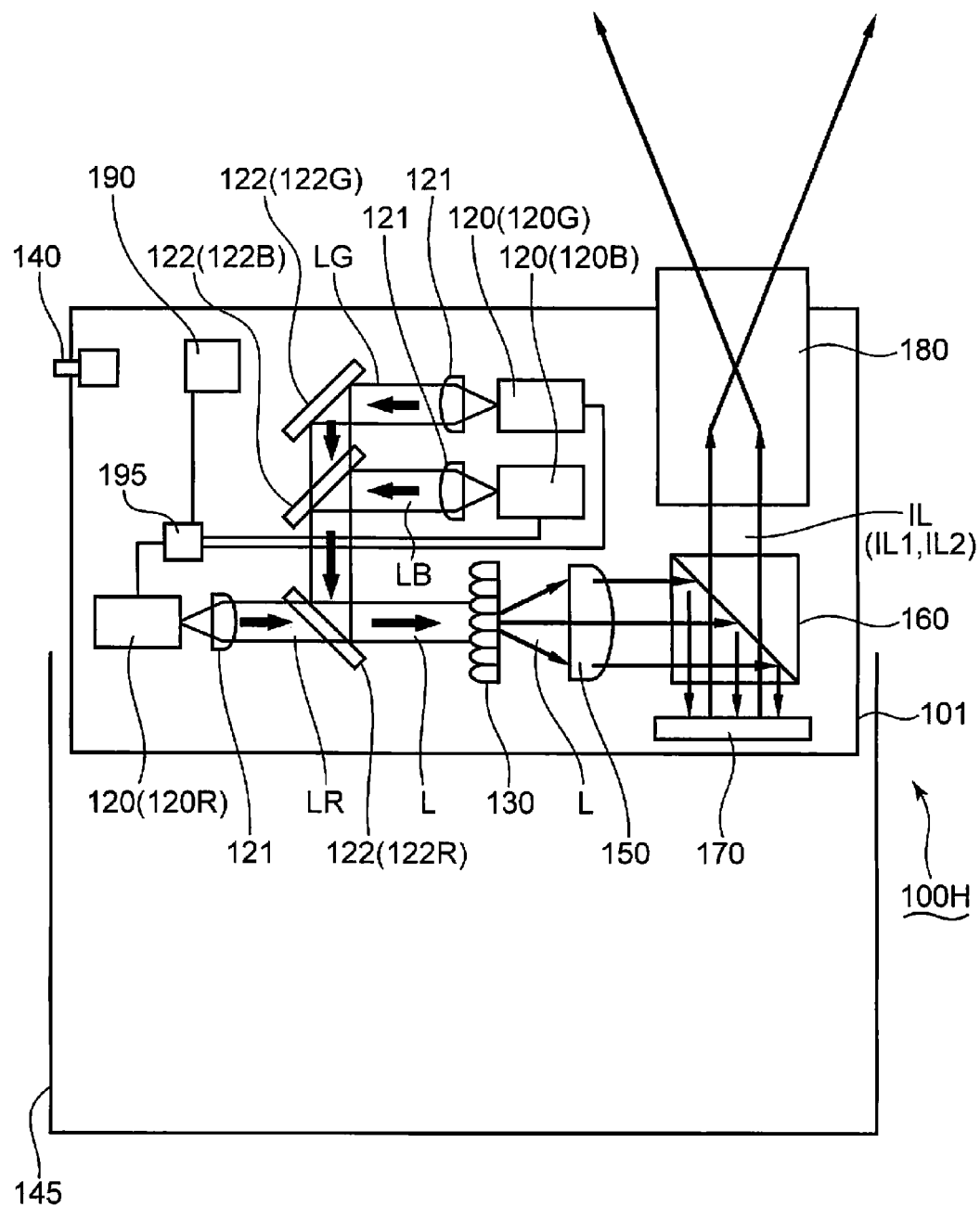
FIG. 19 is a schematic view showing a configuration of a projector according to the ninth embodiment.

FIG. 19 is a schematic view showing a configuration of the projector according to the ninth embodiment. Differences from the projector according to the first embodiment are described with reference to FIG. 19.

The projector 100H according to the ninth embodiment has a power switch 140, which switches ON/OFF of the power supply to generate the image light IL, and a cover 145, which covers the housing 101, in addition to the housing 101, the laser light source 120, the collimate lens 121, the mirror element 122, the diffusion plate 130, the field lens 150, the polarization beam splitter 160, the liquid crystal panel 170, the projection lens 180, the acceleration sensor 190 and the controller 195, which are described in the context of the first embodiment. If the power switch 140 is turned ON, the power is supplied and used for operations of electric elements such as the laser light source 120, the liquid crystal panel 170, the acceleration sensor 190 and the controller 195. If the power switch 140 is turned OFF, the power supply to these electric elements stops.

Figure 20:
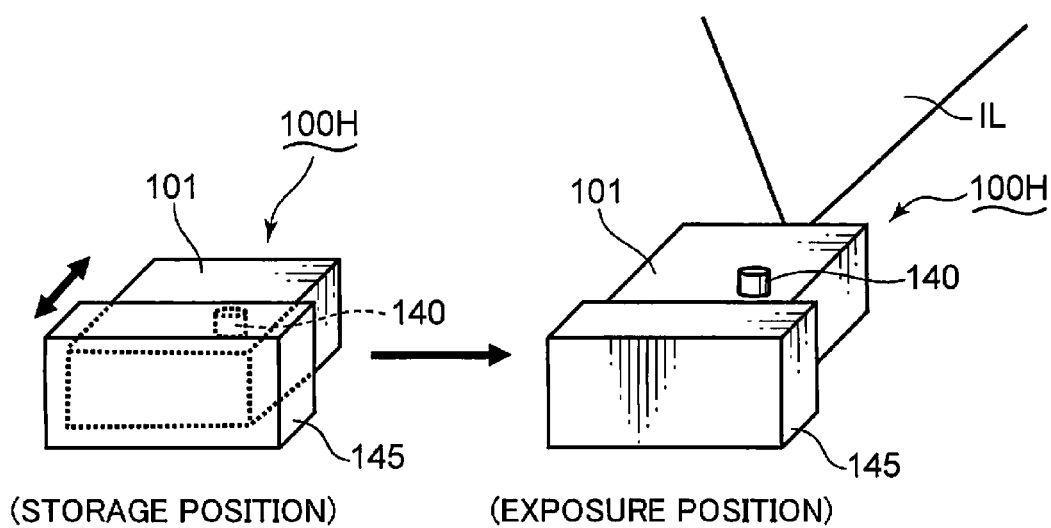
FIG. 20 is a schematic perspective view showing the projector shown in FIG. 19.

FIG. 20 is a schematic perspective view of the projector 100H. The left-hand picture in FIG. 20 is a perspective view of the projector 100H which includes the housing 101 stored in the cover 145. In the following descriptions, the position of the housing 101 shown in the left-hand picture in FIG. 20 is called the "storage position". The right-hand picture in FIG. 20 is a perspective view of the projector 100H which includes the housing 101 drawn from the cover 145. In the following descriptions, the position of the housing 101 shown in the right-hand picture in FIG. 20 is called the "exposure position".

As shown in FIG. 20, the housing 101 is movable between the storage and exposure positions. If the housing 101 is set at the storage position, the power switch 140 is covered by the cover 145. If the housing 101 is set at the exposure position, the power switch 140 is exposed from the cover 145.

If the housing 101 is set at the exposure position, the power switch 140 is exposed from the cover 145. Therefore, a user may operate the power switch 140. If the user operates the power switch 140 to project the image light IL, the power switch 140 protrudes from the housing 101. If the user operates the power switch 140 to stop projecting the image light IL, the power switch 140 is depressed into the housing 101.

If the user mistakenly attempts to store the housing 101 in the cover 145 while the power switch 140 protrudes, the power switch 140 is hooked by the edge of the cover 145. Therefore, if the image light IL is projected, it becomes less likely that the housing 101 is stored in the cover 145.

Since it becomes less likely that the user mistakenly operates the projector 100H, as mentioned above, the image light IL is projected under appropriate operations by the user. As a result, the projector 100H is safely operated.

While the projector 100H emits the image light IL, the power switch 140 stays at the protruding position. Therefore, it becomes less likely that the power switch 140 is covered by the cover 145. Accordingly, the user may easily operate the power switch 140 which is exposed outside the cover 145 (If the power switch is covered by the cover while the projector 100H emits the image light IL, the user has to expose the power switch). Thus, it becomes easy to operate the projector 100H.

The projector 100H becomes smaller in volume when the housing 101 is at the storage position than when the housing 101 is at the exposure position. Since the movement of the housing 101 to the storage position enhances portability, a user stores the housing 101 in the cover 145 to carry the projector 100H.

As mentioned above, the power switch is OFF if the housing 101 is at the storage position. Therefore, the user may safely carry the projector 100H.

The user may move the housing 101 to the exposure position to use the projector 100H. If the housing 101 is moved to the exposure position, the volume of the projector 101H increases, which results in improved heat radiation of the projector 100H in use. The increase in volume of the projector 100H makes the projector 100H less susceptible from an external force such as external vibration. Therefore, there is less fluctuation in position and direction of the projector 100H. As a result, the projector 100H, which is less susceptible from the external force, may stably display images.

If the housing 101 is at the exposure position, the longest dimension of the projector 100H is preferably set to 80 mm or more. If the projector 100H has the longest dimension of 80 mm or more, the projector 100H is less likely to fall. Therefore, the projector 100H is safely operated.

Figure 21:
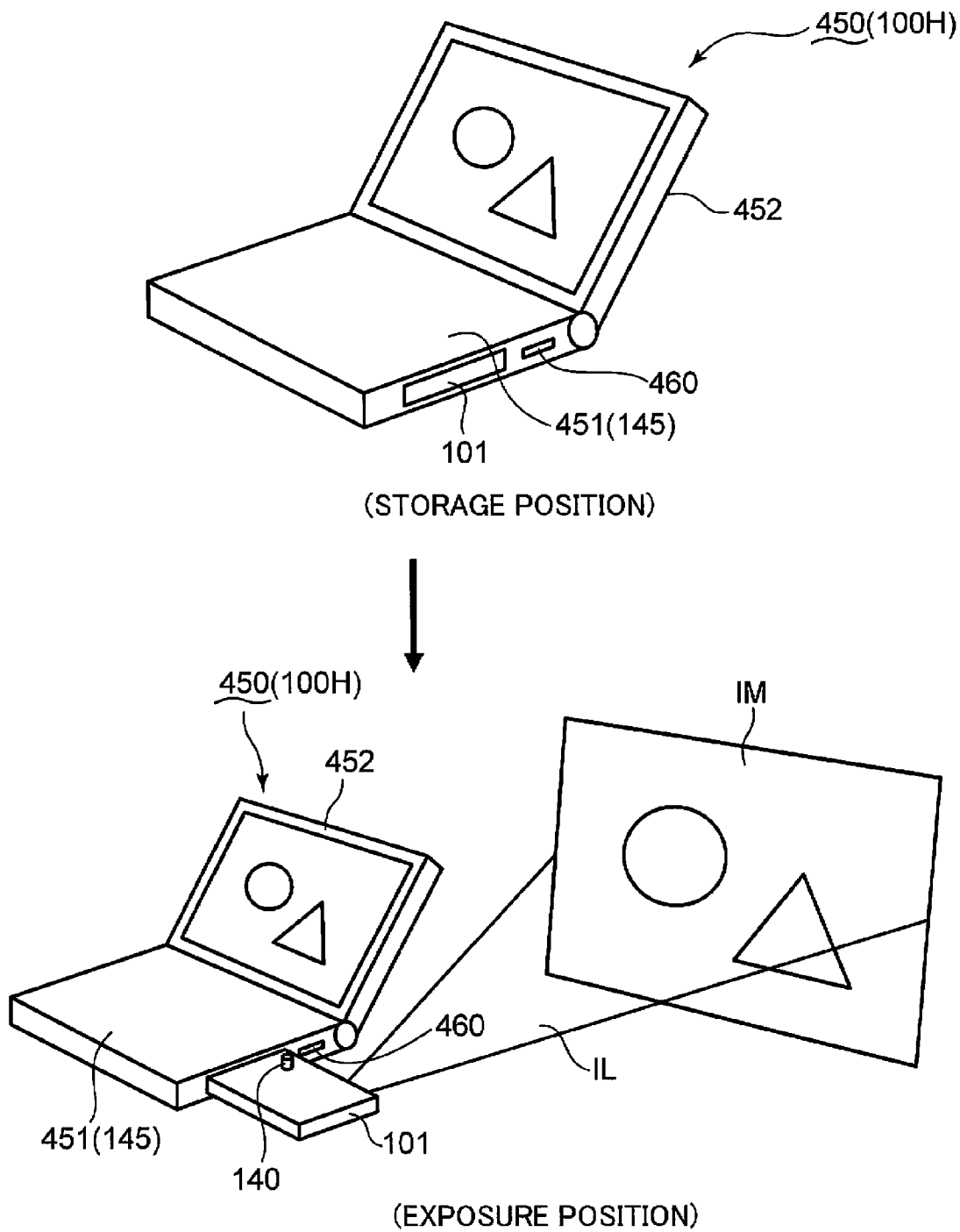
FIG. 21 is a schematic perspective view showing a laptop PC (Personal Computer) in which a housing of the projector shown in FIG. 19 is integrated.

FIG. 21 is a schematic perspective view depicting a laptop PC (Personal Computer) in which the housing 101 is integrated. The laptop PC is described with reference to FIGS. 19 to 21.

The laptop PC 450 includes a PC housing 451 and a pivotal display portion 452 which is connected to the PC housing 451. The PC housing 451 is used as the cover 145, which is described with reference to FIGS. 19 and 20. The housing 101 shown in the upper picture of FIG. 21 is at the storage position. The housing 101 shown in the lower picture of FIG. 21 is at the exposure position.

The laptop PC 450 further includes an ejection button 460 which is situated on a side surface of the PC housing 451. A user operates the ejection button 460 to move the housing 101 between the storage and exposure positions.

If the user operates the ejection button 460 to expose the housing 101 from the PC housing 451, the user may then operate the power switch 140 as described with reference to FIG. 20. For example, the user may operate the power switch 140 and project the image light IL from the housing 101 to display an image IM on the screen. Thus, the laptop PC 450 may be used as the projector 100H.

If the user then attempts to operate the ejection button 460 and move the housing 101 to the storage position without operating the power switch 140, the power switch 140 becomes hooked on the PC housing 451 and interrupts movement of the housing 101 to the storage position.

If the user operates the power switch 140 to stop projecting the image light IL, the power switch 140 is depressed into the housing 101. If the user then operates the ejection button 460, the housing 101 is smoothly stored in the PC housing 451.

According to the present embodiment, the housing 101 is built into the laptop PC 450. Alternatively, the housing 101 may be integrated into other electronic devices (e.g. digital still camera, digital video camera and portable audio device).

Tenth Embodiment

A projector typically forms an image in response to image signals. A projector described in the tenth embodiment controls projection of image light on the basis of presence or absence of input image signals.

Figure 22:
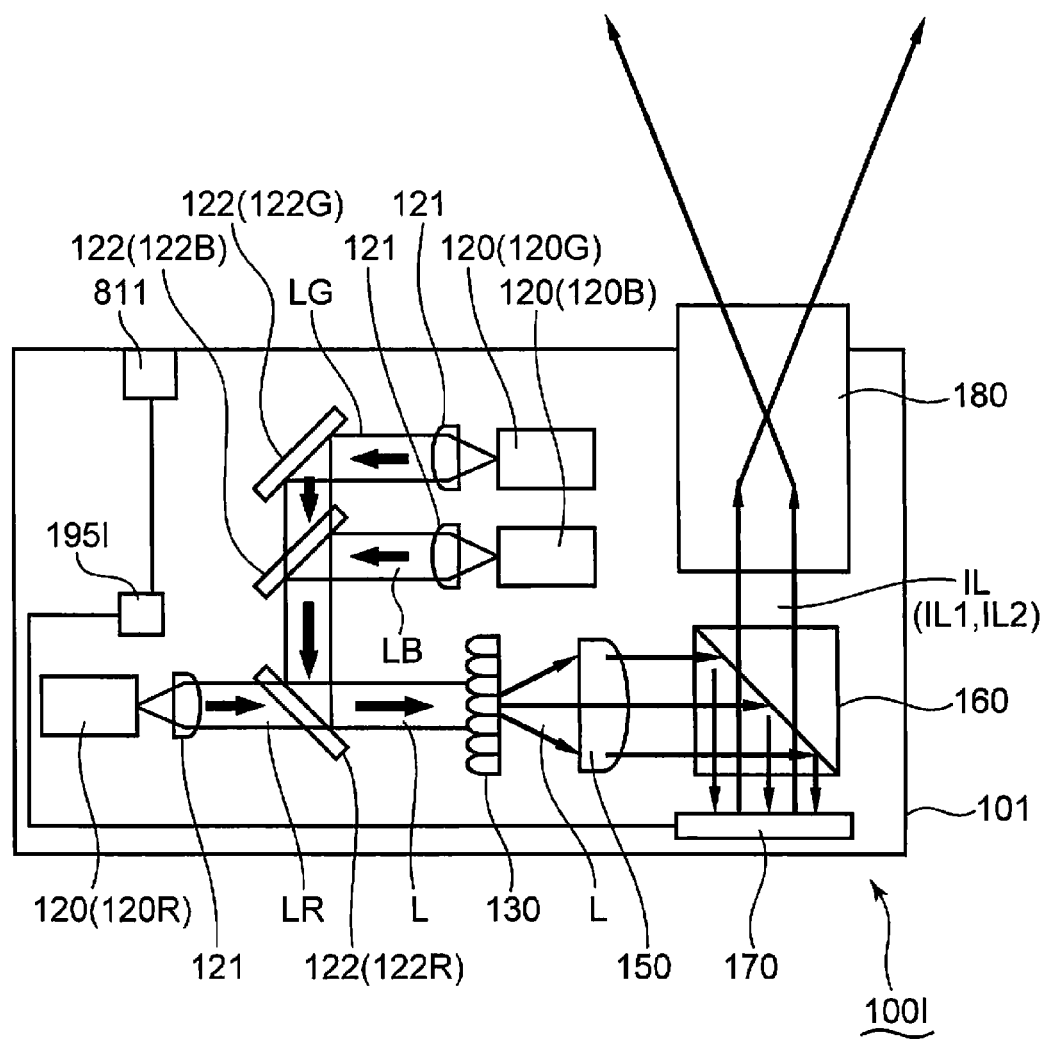
FIG. 22 is a schematic view showing a configuration of a projector according to the tenth embodiment.

FIG. 22 is a schematic view showing a configuration of the projector according to the tenth embodiment. Differences from the projector according to the first embodiment are described with reference to FIG. 22.

The projector 100I according to the tenth embodiment has an input port 811 to which image signals are input, and a controller 195I which drives the liquid crystal panel 170 in response to the image signal, in addition to the housing 101, the laser light source 120, the collimate lens 121, the mirror element 122, the diffusion plate 130, the field lens 150, the polarization beam splitter 160, the liquid crystal panel 170 and the projection lens 180, which are described in the context of the first embodiment.

Figure 23:
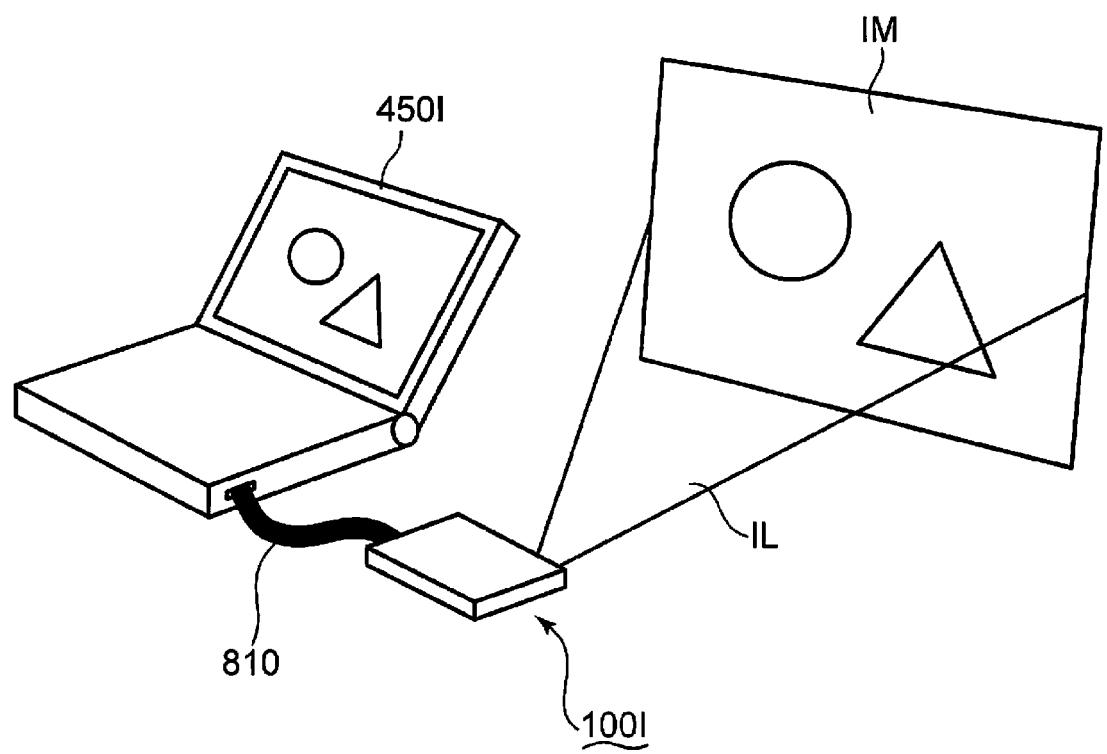
FIG. 23 is a schematic perspective view showing the projector shown in FIG. 22.

FIG. 23 is a schematic perspective view depicting the projector 100I connected to a laptop PC. The projector 100I is further described with reference to FIGS. 22 and 23.

The projector 100I is connected to the laptop PC 450I via a USB (Universal Serial Bus) cable 810. The USB cable 810 is connected to the input port 811.

The controller 195I determines whether the USB cable 810 is appropriately connected to the input port 811. For example, if the controller 195I receives image signals from the input port 811, the controller 195I drives the laser light source 120 and operates the liquid crystal panel 170 in response to the image signals. As a result, for example, the image light IL is projected from the projector 100I to display an image IM in response to the image signals on a screen.

Unless the USB cable 810 is appropriately connected to the input port 811, the controller 195I does not receive image signals from the input port 811. In this case, for example, the controller 195I stops driving the laser light source 120 or the controller 195I continue driving the green laser light source 120G whereas the controller 195I stops driving the red and blue laser light sources 120R, 120B. As a result, the projector 100I may project the image light IL2 at the second power, which is harmless for the user and viewers.

The input port 811 may be a general USB connector used for many electric apparatuses. The image signals are communicated between the laptop PC 450I and the projector 100I via the USB cable 810. The projector 100I may display the image IM in response to the image signals sent from the laptop PC 450I.

As mentioned above, without appropriate connection of the USB cable 810 to the input port 811, the projector 100I does not project the image light IL1 at the first power to display a highly bright image, which results in safe operation of the projector 100I.

The projector 100I may receive power supplied from the laptop PC 450I via the USB cable 810. If the power of the projector 100I is supplied from the laptop PC 450I, a battery of the projector 100I may be compact. Otherwise, the projector 100I may require no battery. As a result, the projector 100I may become compact.

If the image light IL2 at the second power (e.g. image light IL generated only with the green laser beam LG) is projected from the projector under inappropriate connection between the USB cable 810 and the input port 811, the user may figure out that the projector 100I does not receive the image signals or that power of the protector 100I is not ON. Therefore, it becomes easy to operate the projector 100I.

According to the present embodiment, the controller 195I determines whether the USB cable 810 is connected on the basis of presence or absence of received image signals. Alternatively, the controller may determine whether an HDMI (High-Definition Multimedia Interface) cable, or a VGA (Video Graphics Array) cable, or a DVI (Digital Visual Interface) cable is connected, instead of a USB cable, on the basis of presence or absence of received image signals. Further alternatively, the controller may determine whether an SD card is inserted on the basis of presence or absence of received image signals. Yet further alternatively, the controller may determine whether a B-CAS (BS Conditional Access Systems) card, which is required for a receiver of ground digital broadcasting, is inserted on the basis of presence or absence of received image signals.

According to the present embodiment, the controller 195I controls the liquid crystal panel 170 and the laser light source 120 based on presence or absence of received image signals. The controller 195I may control the liquid crystal panel 170 and the laser light source 120 in response to the signals from the aforementioned acceleration sensor and gravity switch.

Eleventh Embodiment

If an external force is accidentally applied to a projector, the projector may fall from a supporting surface such as a surface of a table. If image light at a high power level is continuously projected from the projector after the projector falls, the image light may be accidentally projected onto a user and viewers. A projector described in the eleventh embodiment may automatically stop projecting the image light if the projector accidentally receives an external force.

Figure 24:
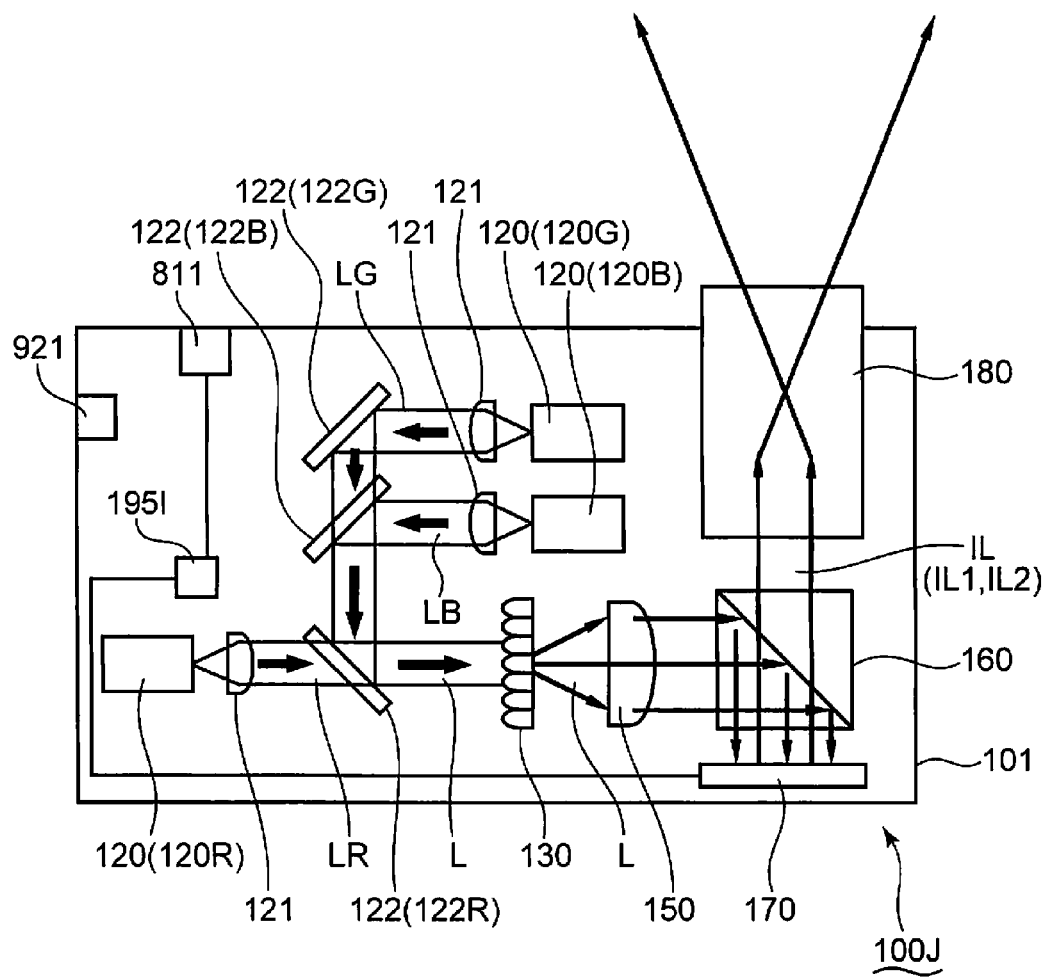
FIG. 24 is a schematic view showing a configuration of a projector according to the eleventh embodiment.

FIG. 24 is a schematic view showing a configuration of the projector according to the eleventh embodiment. Differences from the projector according to the tenth embodiment are described with reference to FIG. 24.

The projector 100J according to the eleventh embodiment includes a connector 921 in addition to the housing 101, the laser light source 120, the collimate lens 121, the mirror element 122, the diffusion plate 130, the field lens 150, the polarization beam splitter 160, the liquid crystal panel 170, the projection lens 180, the input port 811 and the controller 195I, which are described in the context of the tenth embodiment.

Figure 25:
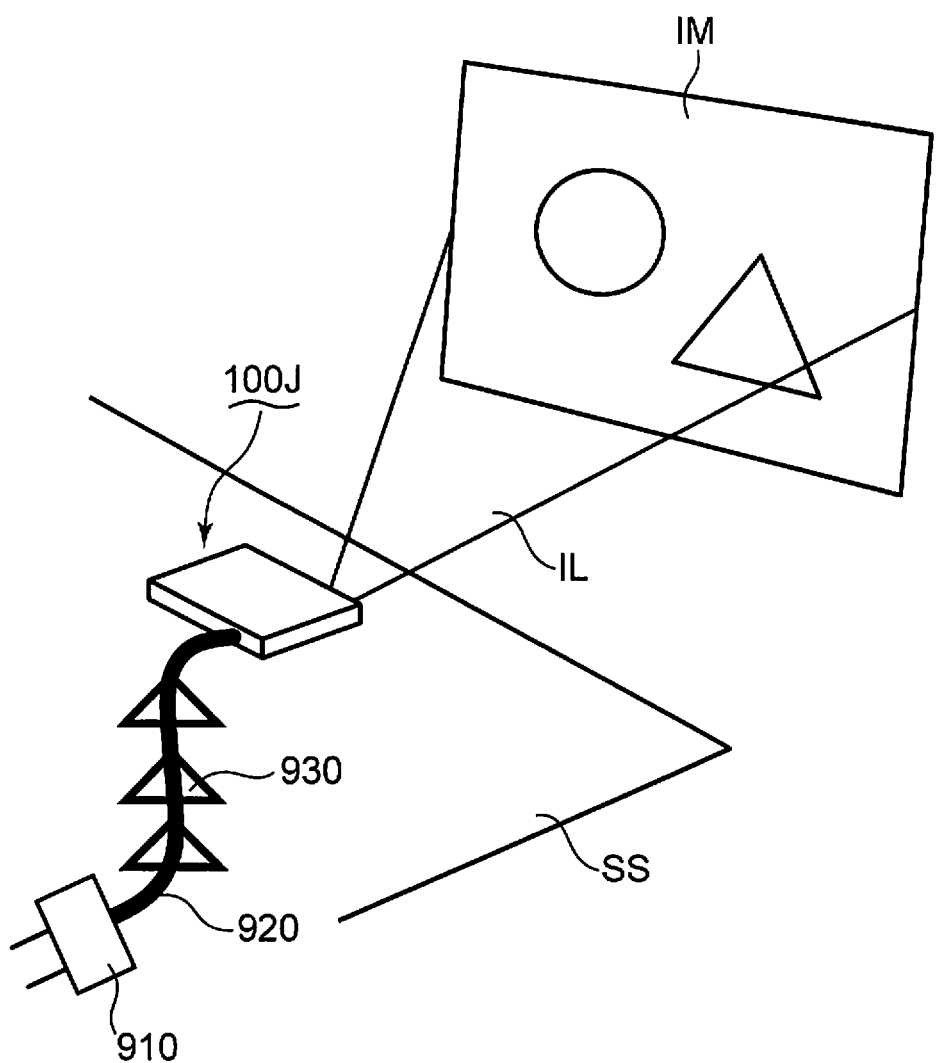
FIG. 25 is a schematic perspective view showing the projector shown in FIG. 24.

FIG. 25 is a schematic perspective view depicting the projector 100J. The projector 100J is further described with reference to FIGS. 24 and 25.

The projector 100J is connected to a power supply such as a socket (not shown) via a power cord 920. One end of the power cord 920 includes a power plug 910 which is connected to the power supply. The other end of the power cord 920 is connected or detached to or from the connector 921. The projector 100J is connected to the power supply via the power cord 920 to supply the power used for operations of the electric elements such as the laser light source 120, the liquid crystal panel 170 and the controller 195I. As a result, for example, the projector 100J projects the image light IL to display an image IM on a screen.

The power cord 920 further includes a suction disk 930. The suction disk 930 adheres to the supporting surface SS on which the projector 100J is placed. A friction coefficient between the suction disk 930 and the supporting surface SS thus becomes higher than a friction coefficient between the projector 100J and the supporting surface SS.

The projector 100J does not include a special mechanism to firmly hold the power cord 920 attached to the connector 921. Therefore, it may requires a smaller force to separate the power cord 920 from the connector 921 than to move the suction disk 930 on the supporting surface SS.

If the external force (impact force) is applied to the projector 100J, the projector 100J moves on the supporting surface SS before the power cord 920 moves. For example, if the projector 100J falls from the supporting surface SS, the power cord 920 easily separates from the connector 921 to stop the power supply for operations of the electric elements such as the laser light source 120, the liquid crystal panel 170 and the controller 195I. Therefore, the projector 100J stops projecting the image light IL.

As mentioned above, if an external force or impact force is applied to the projector 100J without intention of the user, the projector 100J instantaneously stops projecting the image light IL. Therefore, the projector 100J is safely operated.

According to the present embodiment, the suction disk 930 makes the power cord 920 fixed to the supporting surface SS. Alternatively, the power cord may be connected to the supporting surface by means of other elements which have a higher friction coefficient with the supporting surface than the friction coefficient between the projector and the supporting surface. For example, the power cord may be contacted with the supporting surface by means of a rubber sheet. Alternatively, the power cord may be adhered to the supporting surface by means of an adhesive substance. Alternatively, the power cord may be strongly connected to the supporting surface by means of a magnetic force of a magnet attached to the power cord.

According to the present embodiment, the power cord 920 is connected to the socket. Alternatively, the projector 100J may be connected to other equipment configured to supply power. For example, a USB cable configured to connect the laptop PC to the projector 100J may be used instead of the power cord.

Twelfth Embodiment

A projector projects image light on a projection target such as a screen to display an image. Therefore, it is inappropriate for a projector in use to project image light into air (i.e. project the image light without the projection target). A projector described in the twelfth embodiment controls image light projection based on existence of the projection target.

Figure 26:
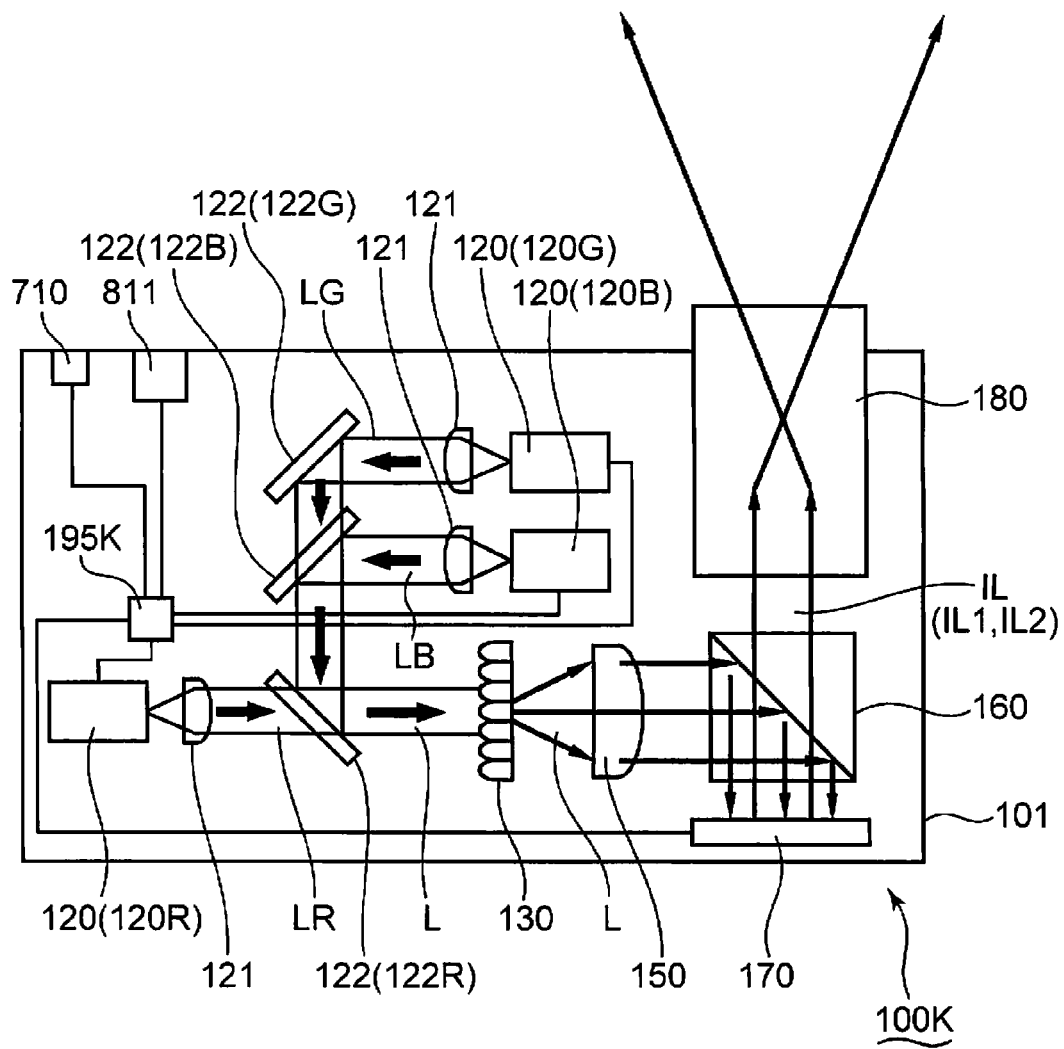
FIG. 26 is a schematic view showing a configuration of a projector according to the twelfth embodiment.

FIG. 26 is a schematic view showing a configuration of the projector according to the twelfth embodiment. Differences from the projector according to the tenth embodiment are described with reference to FIG. 26.

The projector 100K according to the twelfth embodiment has a photodiode 710, which receives reflected light from a projection target such as a screen, and a controller 195K, which controls the laser light source 120 in response to output signals from the photo diode 710, in addition to the housing 101, the laser light source 120, the collimate lens 121, the mirror element 122, the diffusion plate 130, the field lens 150, the polarization beam splitter 160, the liquid crystal panel 170, the projection lens 180 and the input port 811, which are described in the context of the tenth embodiment. The photodiode 710 receives the reflected light of the image light IL if the projector 100K appropriately projects the image light IL onto the projection target. The photodiode 710 is exemplified as the light receiver in the present embodiment.

As described in the context of the tenth embodiment, the image signals are input via the input port 811. The image signal is then output from the input port 811 to the controller 195K. The controller 195K drives the liquid crystal panel 170 in response to the image signals. In the present embodiment, the input port 811 is exemplified as the input portion.

Figure 27A:
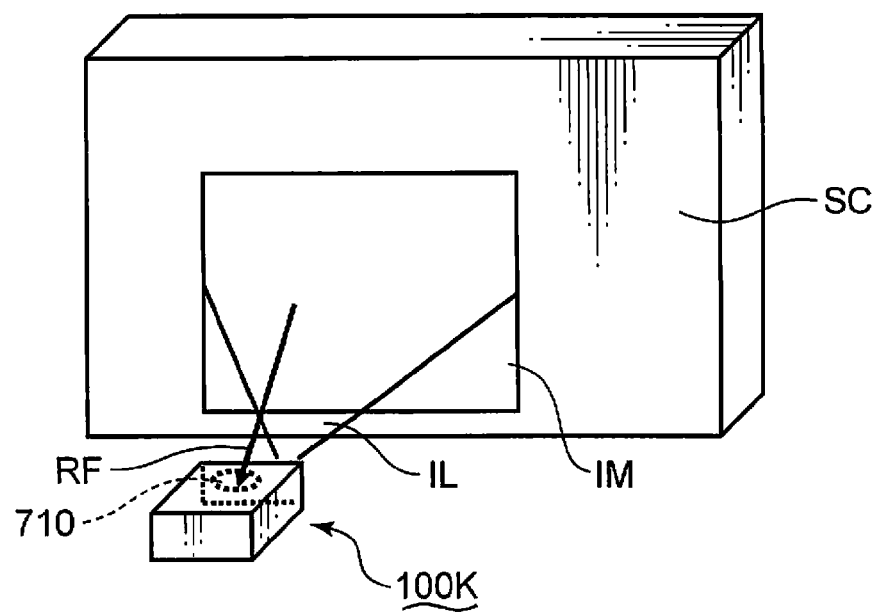
FIG. 27A is a schematic perspective view showing the projector shown in FIG. 26.
Figure 27B:
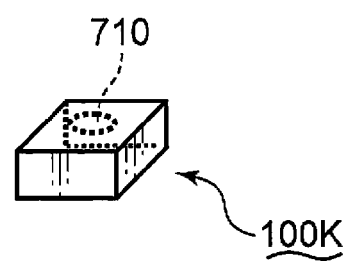
FIG. 27B is a schematic perspective view showing the projector shown in FIG. 26.

FIG. 27A is a schematic perspective view depicting the projector 100K under presence of the projection target. FIG. 27B is a schematic perspective view depicting the projector 100K under absence of the projection target. The projector 100K is further described with reference to FIGS. 26 to 27B.

FIG. 27A shows a screen SC as the projection target. If the projector 100K projects the image light IL onto the screen SC, an image IM is displayed on the screen SC. The image light IL is reflected by the screen SC. The photodiode 710 receives the reflected light RF of the image light IL and external light.

The photodiode 710 outputs light receiving signals, which include light receiving data about the received light, to the controller 195K. The controller 195K calculates differences between the light receiving signal and the image signal. If the projector 100K appropriately projects the image light IL on the screen SC, the differences between the light receiving signal and the image signal are substantially constant, even under switching operation of the displayed images IM. If the projector 100K inappropriately projects the image light IL onto the screen SC, the differences between the light receiving signal and the image signal change in response to the switching operation of the displayed images IM. The controller 195K may determine whether the screen SC exists on the basis of the differences between the light receiving signal and the image signal. The controller 195K determining that the screen SC does not exist controls the laser light source 120 to stops projecting the image light IL1 at the first power for displaying the bright images IM. Otherwise, the controller 195K continues driving the green laser light source 120G whereas the controller 195K stops driving the red and blue laser light sources 120R, 120B, to emit the image light IL2 at the second power, which is harmless for the user and viewers from the projection lens 180.

As mentioned above, without the screen SC, the projector 100K does not receive the reflected light RF, and stops projecting the image light IL1 at the first power. Therefore, the projector 100K is safely operated.

The projector 100K determines whether the projection target exists on the basis of the calculation using the light receiving signal and the image signal. Thus, the projector 100K may appropriately determine whether the projection target exists even if the projection target moves or even if there is a change in projection direction of the projector 100K. Therefore, the projector 100K is safely operated.

Thirteenth Embodiment

It is not preferable that a user leaves a projector projecting image light. A projector described in the thirteenth embodiment may control the projection of the image light on the basis of user's location.

Figure 28:
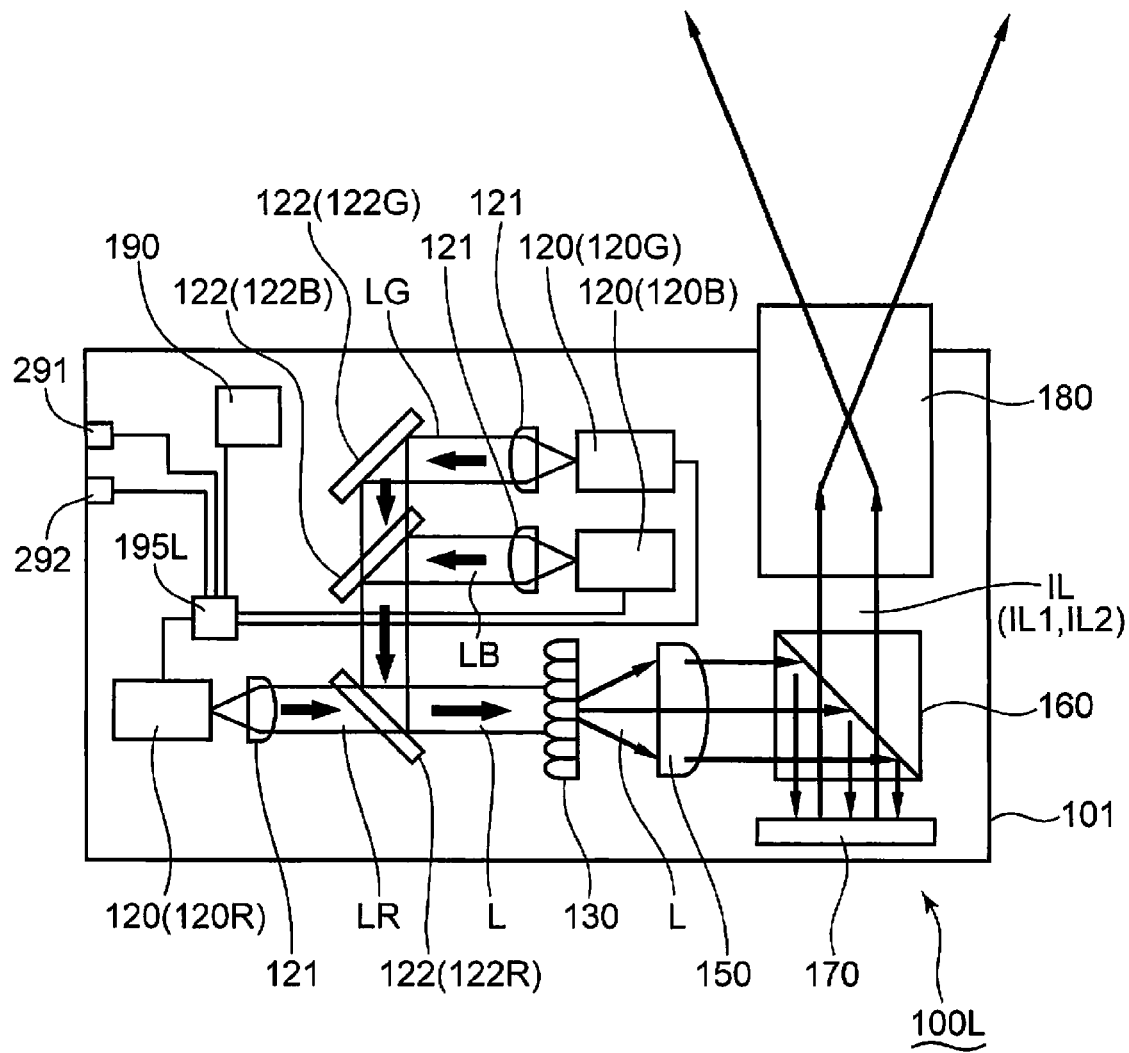
FIG. 28 is a schematic view showing a configuration of a projector according to the thirteenth embodiment.
Figure 28:
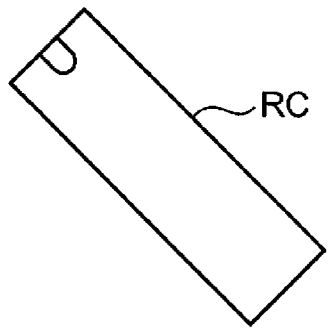

FIG. 28 is a schematic view showing a configuration of the projector according to the thirteenth embodiment. Differences from the projector according to the first embodiment are described with reference to FIG. 28.

The projector 100L according to the thirteenth embodiment is controlled by radio signals transmitted from a remote controller RC. The projector 100L has a receiver 291 which receives the radio signals from the remote controller RC, an ultrasonic sensor 292 which measures a distance between the projector 100L and the remote controller RC, and a controller 195L which controls the laser light source 120 in response to the signals from the acceleration sensor 190, the receiver 291 and the ultrasonic sensor 292, in addition to the housing 101, the laser light source 120, the collimate lens 121, the mirror element 122, the diffusion plate 130, the field lens 150, the polarization beam splitter 160, the liquid crystal panel 170, the projection lens 180 and the acceleration sensor 190, which are described in the context of the first embodiment.

The remote controller RC transmits the radio signal which includes instruction information for instructing operation of the projector 100L. If the receiver 291 receives the radio signal, the controller 195L controls the operation of the projector 100L on the basis of the instruction information. It is preferable that the remote controller RC transmits the instruction information other than initiation of the projection of the image light IL to the projector 100L.

The ultrasonic sensor 292, which measures a distance between the projector 100L and the remote controller RC, outputs distance data, which include information about the measured distance, to the controller 195L. If the controller 195K receives the distance data which indicates a distance exceeding a threshold (e.g. 3 m) determined for the distance between the projector 100L and the remote controller RC, the controller 195L controls the laser light source 120 to stop projecting the image light IL. Otherwise, the controller 195K continues driving the green laser light source 120G whereas the controller 195K stops driving the red and blue laser light sources 120R, 120B, so as to emit the image light IL2 from the projection lens 180 at the second power, which is harmless for the user and viewers.

If the user leaves the projector 100L projecting the image light IL1 at the first power, the projector 100L automatically decreases the power of the image light IL. Therefore, the projector 100L is safely operated.

According to the present embodiment, the ultrasonic sensor 292 measures the distance between the projector 100L and the remote controller RC. Alternatively, the projector may have other sensors (e.g. optical sensors) configured to measure the distance to the remote controller RC.

According to the present embodiment, the remote controller RC does not have a function to turn the power of the projector 100L ON. For example, the remote controller, which is smaller than the projector, may be potentially left on a table. This may accidentally cause a user to touch the remote controller. Since the remote controller RC does not have the function to turn the power of the projector 100L ON, as mentioned above, it is very unlikely that the image light IL at a high power level is projected from the projector 100L, even if the user accidentally operates the remote controller.

In order to supply power to the projector 100L, the user has to directly operate the projector 100L. Therefore, it becomes less likely that control errors or operational errors cause the projection of the image light IL at a high power level. Therefore, the projector 100L is safely operated.

Various embodiments of the projector are described clearly enough for artisan to execute them. The artisan may modify a projector shown in the aforementioned embodiments within a scope without departure from spirits of the aforementioned principles of the projector.

For example, according to these embodiments, a capacitance type acceleration sensor is used as the acceleration sensor. Alternatively, other sensors which detect acceleration (e.g. optical type, semiconductor type, piezo-resistance type and gas temperature distribution type acceleration sensor) may be used.

According to these embodiments, the reflection type liquid crystal panel is used as the spatial modulator. Alternatively, other elements configured to modulate light in response to the image signals (e.g. transmission type liquid crystal panel and DMD (® Texas Instruments, USA)) may be used as the spatial modulator. Alternatively, the projector may have a scanning mirror configured to scan the laser beam. The projector may use the scanning mirror to scan and modulate the laser beam in order to form an image in response to image signals.

The aforementioned embodiments mainly include the following configurations.

A projector for projecting an image light according to the embodiments comprises: a laser light source configured to emit a laser beam; a light modulator which modulates the laser beam to generate the image light; a projection portion configured to project the image light; a detector configured to detect a fixation degree of the projector; and a controller configured to control a power of the image light based on the fixation degree.

According to the aforementioned configuration, the light modulator modulates the laser beam emitted from the laser light source to generate the image light. The projection portion projects the image light. The controller controls the power of the image light on the basis of the fixation degree of the projector detected by the detector. Therefore the projector becomes safe.

In the aforementioned configuration, it is preferable that the controller adjusts the power of the image light with keeping the laser beam emitted from the laser light source.

According to the aforementioned configuration, the controller adjusts the power of the image light with keeping the laser beam emitted from the laser light source. Therefore it becomes less likely that a user loses the projection direction of the image light, which results in improved safety of the projector which is subsequently used.

In the aforementioned configuration, it is preferable that the controller adjusts output of the laser light source based on the fixation degree.

According to the aforementioned configuration, the controller adjusts the output of the laser light source on the basis of the fixation degree to make the projector safe.

In the aforementioned configuration, it is preferable that the controller controls the light modulator based on the fixation degree to adjust the power of the image light.

According to the aforementioned configuration, the controller controls the light modulator on the basis of the fixation degree to adjust the power of the image light. Therefore the projector becomes safe.

In the aforementioned configuration, it is preferable that the detector includes an acceleration sensor, which detects acceleration caused by displacement of the projector, as the fixation degree, the controller sets the power of the image light to a first power for displaying an image if the acceleration sensor detects a first acceleration as the acceleration, and the controller sets the power of the image light to a second power, which is lower than the first power, if the acceleration sensor detects a second acceleration, which is higher than the first acceleration, as the acceleration.

According to the aforementioned configuration, the acceleration sensor detects acceleration, which is caused by displacement of the projector, as the fixation degree. If the acceleration sensor detects the first acceleration as the acceleration, the controller sets the power of the image light to the first power for displaying an image. If the acceleration sensor detects the second acceleration, which is higher than the first acceleration, as the acceleration, the controller sets the power of the image light to the second power, which is lower than the first power. Since the low power of the image light is output while the projector is displaced at high acceleration, the projector becomes safe.

In the aforementioned configuration, it is preferable that the detector includes a placement switch which is operated if the projector is placed on a supporting surface configured to support the projector, the placement switch becomes a first mode if the projector is placed on the supporting surface, or a second mode if the projector is separated from the supporting surface, the controller sets the power of the image light to a first power for displaying an image if the placement switch is in the first mode, and the controller sets the power of the image light to a second power which is lower than the first power if the placement switch is in the second mode.

According to the aforementioned configuration, the detector further comprises the placement switch which is operated if the projector is placed on the supporting surface configured to support the projector. The placement switch enters the first mode if the projector is placed on the supporting surface or the second mode if the projector is separated from the supporting surface. If the placement switch is in the first mode, the controller sets the power of the image light to the first power for displaying an image. If the placement switch is in the second mode, the controller sets the power of the image light to the second power which is lower than the first power to make the projector safe.

In the aforementioned configuration, it is preferable that the controller adjusts the power of the image light based on a magnitude of the acceleration.

According to the aforementioned configuration, the controller adjusts the power of the image light according to the magnitude of the acceleration to make the projector safe.

It is preferable that the projector further comprises an operation portion which a user operates to make the image light output, wherein the controller adjusts the power of the image light based on a magnitude of the acceleration during a first period after the operation portion is operated.

According to the aforementioned configuration, the controller adjusts the power of the image light based on the magnitude of the acceleration during the first period after the user operates the operation portion to make the image light output. Therefore the projector becomes safe.

It is preferable that the projector further comprises an operation portion which a user operates to make the image light output, wherein the controller increases the power of the image light toward the first power with time during a first period after the operation portion is operated.

According to the aforementioned configuration, the controller increases the power of the image light toward the first power with time during the first period after the user operates the operation portion to make the image light output. Therefore the projector becomes safe.

In the aforementioned configuration, it is preferable that the projection portion projects light which has a wavelength to achieve spectral luminous efficiency no less than 0.5 if the controller sets the power of the image light to the second power.

According to the aforementioned configuration, if the controller sets the power of the image light to the second power, the projection portion projects light which has a wavelength to achieve the spectral luminous efficiency no less than 0.5. Therefore the output light is easily recognized even under the low power of the image light. Thus the projector becomes safe.

It is preferable that the projector further comprises a shutter configured to move between a close position where an optical path of the image light projected from the projection portion is closed, and an open position where the optical path of the image light is opened, wherein the controller controls a position of the shutter between the close and open positions based on the fixation degree.

According to the aforementioned configuration, the shutter moves between the close position where the optical path of the image light projected from the projection portion is closed and the open position where the optical path of the image light is opened. Since the controller controls the position of the shutter between the close and open positions on the basis of the fixation degree, the projector becomes safe.

In the aforementioned configuration, it is preferable that the controller moves the shutter to the open position after the laser light source emits the laser beam.

According to the aforementioned configuration, the controller moves the shutter to the open position after the laser light source emits the laser beam to gradually increase the image light amount which passes through the shutter. Thus the projector becomes safe.

In the aforementioned configuration, it is preferable that the operation portion includes an operation switch which makes the projection portion project the image light if the operation portion receives an external force, and the controller projects the image light at the second power from the projection portion if the external force is applied to the operation switch.

According to the aforementioned configuration, the operation portion includes an operation switch which makes the projection portion project the image light if the operation portion receives an external force. Therefore the user may output the image light from the projector. The controller projects the image light at the second power from the projection portion if an external force is applied to the operation portion. Therefore even if the image light is output from the projector because of unintentional operation of the switch, the projector is still safe. The output of the image light at the second power makes the user visually recognize the image light output from the projector.

In the aforementioned configuration, it is preferable that the controller makes the projection portion continuously project the image light at the second power if the external force is removed from the operation switch.

According to the aforementioned configuration, the controller makes the projection portion continuously project the image light at the second power if the external force is removed from the operation switch. Therefore even if the image light is output from the projector because of unintentional operation of the switch, the projector is still safe. The output of the image light at the second power makes the user visually recognize the image light output from the projector.

In the aforementioned configuration, it is preferable that the controller makes the projection portion project the image light at the first power if the external force is continuously applied to the operation switch during a second period.

According to the aforementioned configuration, if the external force is continuously applied to the operation switch during the second period, the controller makes the projection portion project the image light at the first power. Therefore it becomes less likely that the image light is output at the first power because of unintentional operation.

In the aforementioned embodiment, it is preferable that the operation switch includes a first switch and a second switch, and the controller makes the projection portion project the image light if the external force is applied to both the first and second switches.

According to the aforementioned configuration, if the external force is applied to both the first and second switches, the controller makes the projection portion project the image light. Therefore it becomes less likely that the image light is output at the first power because of unintentional operation.

In the aforementioned configuration, it is preferable that the projection portion projects the image light onto the supporting surface.

According to the aforementioned configuration, the projection portion projects the image light onto the supporting surface to make the projector safe.

It is preferable that the projector further comprises: a light receiver configured to receive reflected light of the image light projected from the projection portion; and an input port to which an image signal is input to generate the image light, wherein the controller adjusts the power of the image light based on the reflected light and the image signal.

According to the aforementioned configuration, the projector further comprises a light receiver which receives the reflected light of the image light projected from the projection portion, and an input portion to which an image signal is input to generate the image light. The controller adjusts the power of the image light on the basis of the reflected light and the image signal. Therefore the power of the image light is appropriately adjusted on the basis of presence or absence of the image light projected onto a projection surface.

In the aforementioned configuration, it is preferable that the laser light source includes: a red laser light source configured to irradiate a red laser beam; a blue laser light source configured to irradiate a blue laser beam; and a green laser light source configured to irradiate a green laser beam, the red, blue and green laser light sources emit the laser beam if the controller sets the power of the image light to the first power, and only the green laser light source emits the laser beam if the controller sets the power of the image light to the second power.

According to the aforementioned configuration, the laser light source further comprises the red, blue and green laser light sources configured to irradiate the red, blue and green laser beams, respectively. Therefore if the controller sets the power of the image light to the first power, the projector may display a color image. Since only the green laser light source emits the laser beam if the controller sets the power of the image light to the second power, visual recognition of the light output is facilitated even under the low power of the image light to make the projector safe.

In the aforementioned configuration, it is preferable that the green laser light source includes: an excitation light source configured to generate excitation light; a laser medium configured to generate fundamental wave light in response to the excitation light; and a wavelength converter configured to convert a wavelength of the fundamental wave light into that of the green laser beam.

The laser medium generates the fundamental wave light in response to the excitation light generated by the excitation light source. Since the wavelength converter converts the wavelength of the fundamental wave light into that of the green laser beam, the projector may appropriately display a color image.

A projector for projecting an image light according to the aforementioned embodiments comprises a laser light source configured to emit a laser beam; a light modulator which modulates the laser beam to generate the image light; a projection portion configured to project the image light; a housing configured to store the laser light source, the light modulator and the projection portion; a power switch situated on an outer surface of the housing to switch ON/OFF of power supply for generating the image light; and a cover configured to cover the power switch, wherein the housing is configured to move with respect to the cover between a storage position where the power switch is covered by the cover and an exposure position where the power switch is exposed from the cover, and if the power switch is turned ON, the power switch makes the housing immobile from the exposure position to the storage position.

According to the aforementioned configuration, the light modulator modulates the laser beam emitted from the laser light source to generate the image light. The projection portion projects the image light. The housing houses the laser light source, the light modulator and the projection portion. The cover covers the power switch configured to switch ON/OFF to supply power for generating the image light. The housing may move with respect to the cover between the storage position where the power switch is covered by the cover and the exposure position where the power switch is exposed from the cover. If the power switch is turned ON, the power switch makes the housing immobile from the exposure position to the storage position to make it difficult that the housing is housed in the cover while the power supply is ON. Thus the projector becomes safe.

In the aforementioned configuration, it is preferable that the controller detects presence or absence of the image signal output to the light modulator to switch the first or second power, depending on whether there is the image signal output to the light modulator.

According to the aforementioned configuration, the controller detects presence or absence of the image signal output to the light modulator to switch the first or second power, depending on whether there is the image signal output to the light modulator. Therefore the projector becomes safe.

In the aforementioned configuration, it is preferable that the projector further comprises a signal cable configured to output the image signal to the light modulator, and the controller switches the first or second power, depending on whether the input portion is connected with the signal cable.

According to the aforementioned configuration, the controller switches the first or second power, depending on whether the input portion is connected with the signal cable to output the image signal to the light modulator. Therefore the projector becomes safe.

In the aforementioned configuration, it is preferable that the projector further comprises an SD card for outputting the image signal to the light modulator, and the controller switches the first or second power, depending on whether the input portion is connected with the SD card.

According to the aforementioned configuration, the controller switches the first or second power, depending on whether the input portion is connected with the SD card to output the image signal to the light modulator. Therefore the projector becomes safe.

In the aforementioned configuration, it is preferable that the projector further comprises a B-CAS card for outputting the image signal to the light modulator, and the controller switches the first or second power, depending on whether the input portion is connected with the B-CAS card.

According to the aforementioned configuration, the controller switches the first or second power, depending on whether the input portion is connected with the B-CAS card to output the image signal to the light modulator. Therefore the projector becomes safe.

It is preferable that the projector further comprises an image capture element which captures of an image of a projection surface, onto which the image light is projected, to acquire the image data, and the controller determines whether a predetermined object is captured to switch the first or second power, depending on whether there is the predetermined object.

According to the aforementioned configuration, the image capture element captures the image of the projection surface, onto which the image light is projected, to acquire the image data. The controller determines whether the predetermined object is captured to switch the first or second power, depending on whether there is the predetermined object. Therefore the projector becomes safe.

It is preferable that the projector further comprises a remote controller configured to wirelessly instruct operation of the projector, and a distance measuring element configured to measure a distance between the projector and the remote controller, wherein the controller sets the power of the image light to the second power if the distance between the projector and the remote controller is longer than a predetermined distance.

According to the aforementioned configuration, the projector further comprises the remote controller configured to wirelessly instruct operation of the projector, and a distance measuring element configured to measure the distance between the projector and the remote controller. If the distance between the projector and the remote controller is longer than the predetermined distance, the controller sets the power of the image light to the second power to make the projector safe.

In the aforementioned configuration, it is preferable that the remote controller instructs operation other than activating operation of the projector.

According to the aforementioned configuration, the remote controller instructs operations other than activating operation of the projector. Therefore the activating operation of the projector is instructed by the operation portion to make the projector safe.

It is preferable that the aforementioned configuration further comprises a connection element configured to connect the signal cable to the supporting surface, wherein the connection element requires a greater force to connect the signal cable to the supporting surface than to separate the signal cable from the input portion, and the controller which sets the power of the image light to the second power stops projection of the image light from the projection portion.

According to the aforementioned configuration, the projector further comprises the connection element configured to connect the signal cable to the supporting surface. The connection element requires a greater force to connect the signal cable to the supporting surface than to separate the signal cable from the input portion. Therefore the input portion and the signal cable are disconnected earlier than disconnection between the supporting surface and the signal cable. Since the controller which sets the power of the image light to the second power stops the projection of the image light from the projection portion, the projector stops projection of the image light if there is the disconnection between the input portion and the signal cable to make the projector safe.

It is preferable that the projector further comprises a power cable through which power is supplied to the projector and a power connector which is connected to the power cable, wherein the connection element requires a greater force to connect the power cable to the supporting surface than to disconnect the power cable from the power connector.

According to the aforementioned configuration, the connection element requires a greater force to connect the power cable to the supporting surface than to disconnect the power cable from the power connector. Since the connection between the input portion and the signal cable is separated earlier than disconnection between the supporting surface and the signal cable, the projector become safe.

The principles of the present embodiments are preferably applied to a projector which displays images by means of a laser light source, and contributes to providing a highly operable and safe projector.

The invention claimed is:

1. A projector for projecting image light, comprising:
a laser light source configured to emit a laser beam;
a light modulator which modulates the laser beam to generate the image light;
a projection portion configured to project the image light;
a detector configured to detect a fixation degree of the projector; and
a controller configured to control a power of the image light based on the fixation degree, wherein
the detector includes a placement switch which is operated if the projector is placed on a supporting surface configured to support the projector,
the placement switch becomes a first mode if the projector is placed on the supporting surface, or a second mode if the projector is separated from the supporting surface,
the controller sets the power of the image light to a first power for displaying an image if the placement switch is in the first mode, and
the controller sets the power of the image light to a second power which is lower than the first power if the placement switch is in the second mode.

2. The projector according to claim 1, further comprising an operation portion which a user operates to make the image light output, wherein
the controller increases the power of the image light toward the first power with time during a first period after the operation portion is operated.

3. A projector for projecting image light, comprising:
a laser light source configured to emit a laser beam;
a light modulator which modulates the laser beam to generate the image light;
a projection portion configured to project the image light;
an acceleration sensor configured to detect acceleration caused by displacement of the projector; and
a controller configured to control a power of the image light based on the acceleration, wherein
the controller sets the power of the image light to a first power for displaying an image if the acceleration sensor detects a first acceleration as the acceleration,
the controller sets the power of the image light to a second power, which is lower than the first power, if the acceleration sensor detects a second acceleration, which is higher than the first acceleration, as the acceleration, and
the projection portion projects light which has a wavelength to achieve spectral luminous efficiency no less than 0.5 if the controller sets the power of the image light to the second power.

4. A projector for projecting image light, comprising:
a laser light source configured to emit a laser beam;
a light modulator which modulates the laser beam to generate the image light;
a projection portion configured to project the image light;
a detector configured to detect a fixation degree of the projector;
a controller configured to control a power of the image light based on the fixation degree; and
a shutter configured to move between a close position where an optical path of the image light projected from the projection portion is closed, and an open position where the optical path of the image light is opened, wherein
the controller controls a position of the shutter between the close and open positions based on the fixation degree.

5. The projector according to claim 4, wherein
the controller moves the shutter to the open position after the laser light source emits the laser beam.

6. A projector for projecting image light, comprising:
a laser light source configured to emit a laser beam;
a light modulator which modulates the laser beam to generate the image light;
a projection portion configured to project the image light;
an acceleration sensor configured to detect acceleration caused by displacement of the projector;
a controller configured to adjust a power of the image light based on a magnitude of the acceleration; and
an operation switch which a user operates to make the projection portion project the image light if the operation switch receives and external force, wherein
the controller sets the power of the image light to a first power for displaying an image if the acceleration sensor detects a first acceleration as the acceleration,
the controller sets the power of the image light to a second power, which is lower than the first power, if the acceleration sensor detects a second acceleration, which is higher than the first acceleration, as the acceleration,
the controller adjusts the power of the image light based on a magnitude of the acceleration during a first period after the operation switch is operated, and
the controller makes the projection portion project the image light at the second power from the projection portion if the external force is applied to the operation switch.

7. The projector according to claim 6, wherein
the controller makes the projection portion continuously project the image light at the second power if the external force is removed from the operation switch.

8. The projector according to claim 7, wherein
the controller makes the projection portion project the image light at the first power if the external force is continuously applied to the operation switch during a second period.

9. A projector for projecting image light, comprising:
a laser light source configured to emit a laser beam;
a light modulator which modulates the laser beam to generate the image light;
a projection portion configured to project the image light;
an acceleration sensor configured to detect acceleration caused by displacement of the projector;
a controller configured to adjust a power of the image light based on a magnitude of the acceleration; and
an operation portion which is user operates to make the image light output, wherein
the controller sets the power of the image light to a first power for displaying an image if the acceleration sensor detects a first acceleration as the acceleration,
the controller sets the power of the image light to a second power, which is lower than the first power, if the acceleration sensor detects a second acceleration, which is higher than the first acceleration, as the acceleration,
the controller adjusts the power of the image light based on a magnitude of the acceleration during a first period after the operation portion is operated,
the operation portion includes a first switch and a second switch, and
the controller makes the projection portion project the image light if an external force is applied to both the first and second switches.

10. The projector according to claim 1, wherein
the projection portion projects the image light onto the supporting surface.

11. The projector according to claim 3, wherein
the laser light source includes: a red laser light source configured to irradiate a red laser beam; a blue laser light source configured to irradiate a blue laser beam; and a green laser light source configured to irradiate a green laser beam, the red, blue and green laser light sources emit the laser beam if the controller sets the power of the image light to the first power, and only the green laser light source emits the laser beam if the controller sets the power of the image light to the second power.

12. The projector according to claim 11, wherein
the green laser light source includes:

an excitation light source configured to generate excitation light;

a laser medium configured to generate fundamental wave light in response to the excitation light; and a wavelength converter configured to convert a wavelength of the fundamental wave light into that of the green laser beam.

* * * * *